United States Patent
Ramalho et al.

(10) Patent No.: US 10,141,973 B1
(45) Date of Patent: Nov. 27, 2018

(54) ENDPOINT PROXIMITY PAIRING USING ACOUSTIC SPREAD SPECTRUM TOKEN EXCHANGE AND RANGING INFORMATION

(71) Applicant: Cisco Technology, Inc., San Jose, CA (US)

(72) Inventors: Michael A. Ramalho, Lakewood Ranch, FL (US); Mihailo Zilovic, Lawrenceville, NJ (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/631,679

(22) Filed: Jun. 23, 2017

(51) Int. Cl.
  *H04B 1/709* (2011.01)
  *H04R 1/34* (2006.01)
  *H04N 21/422* (2011.01)
  *H04H 20/30* (2008.01)

(52) U.S. Cl.
  CPC .............. *H04B 1/709* (2013.01); *H04H 20/30* (2013.01); *H04N 21/42203* (2013.01); *H04R 1/345* (2013.01)

(58) Field of Classification Search
  CPC .. H04B 1/709; H04H 20/30; H04N 21/42203; H04R 1/345
  See application file for complete search history.

(56) References Cited

U.S. PATENT DOCUMENTS

| | | | | |
|---|---|---|---|---|
| 5,331,602 | A | * | 7/1994 | McLaren .............. G01S 5/0009 367/127 |
| 6,141,337 | A | | 10/2000 | Uta et al. |
| 7,729,204 | B2 | | 6/2010 | Peng et al. |
| 7,852,318 | B2 | | 12/2010 | Altman |
| 8,259,603 | B2 | | 9/2012 | Kuroda et al. |

(Continued)

FOREIGN PATENT DOCUMENTS

CN 104753561 A 7/2015

OTHER PUBLICATIONS

T. Yoshioka, et al., "Making Machines Understand Us in Reverberant Rooms", [Robustness against reverberation for automatic speech recognition], Fundamental Technologies in Modem Speech Recognition, IEEE Signal Processing Magazine, Nov. 2012, 13 pages.

(Continued)

*Primary Examiner* — Freshten N Aghdam
(74) *Attorney, Agent, or Firm* — Edell, Shapiro & Finnan, LLC

(57) ABSTRACT

A first endpoint generates an acoustic spread spectrum signal including a pilot sequence and a data sequence representing a token synchronized to the pilot sequence, transmits the acoustic spread spectrum signal, and records a transmit time at which the acoustic spread spectrum signal is transmitted. A receive time at which a second endpoint received the acoustic spread spectrum signal transmitted by the first endpoint is received from the second endpoint along with an indication of a second token as recovered from the received acoustic spread spectrum signal by the second endpoint. A separation distance between the first endpoint and the second endpoint is computed based on a time difference between the transmit time and the receive time. The first endpoint is paired with the second endpoint when the token matches the second token and the computed distance is less than a threshold distance.

20 Claims, 17 Drawing Sheets

(56) References Cited

U.S. PATENT DOCUMENTS

| | | | |
|---|---|---|---|
| 8,787,942 B2* | 7/2014 | Hannan | G01S 5/0036 370/328 |
| 9,319,096 B1 | 4/2016 | Rifkin et al. | |
| 2003/0043775 A1 | 3/2003 | Kikuchi | |
| 2004/0071195 A1 | 4/2004 | Huang et al. | |
| 2006/0267841 A1* | 11/2006 | Lee | G01S 5/0081 342/463 |
| 2010/0118989 A1 | 5/2010 | Sayana et al. | |
| 2011/0179182 A1 | 7/2011 | Vadla Ravnäs | |
| 2013/0315079 A1* | 11/2013 | Edge | H04W 4/02 370/252 |
| 2013/0316727 A1* | 11/2013 | Edge | H04W 4/02 455/456.1 |
| 2014/0192622 A1 | 7/2014 | Rowe et al. | |
| 2015/0139343 A1 | 5/2015 | Chen et al. | |
| 2015/0327001 A1 | 11/2015 | Kirshenberg et al. | |
| 2016/0178748 A1* | 6/2016 | Shin | G01S 15/42 367/99 |
| 2016/0356876 A1 | 12/2016 | Lazik et al. | |

OTHER PUBLICATIONS

K.K. Wong, et al., "Spread Spectrum Techniques for Indoor Wireless IR Communications", Optical Wireless Communications, IEEE Wireless Communications, Apr. 2003, 11 pages.

H. Delic, et al., "The Prometheus Orthonormal Set for Wideband CDMA", IEEE MELECON 2004, May 12-15, 2004, Dubrovnik, Croatia, 4 pages.

* cited by examiner

1400

1402 — FIRST ENDPOINT GENERATES ACOUSTIC SPREAD SPECTRUM SIGNAL INCLUDING SPREAD DATA SEQUENCE SYNCHRONIZED WITH PILOT SEQUENCE, WHEREIN SPREAD DATA SEQUENCE ENCODES TOKEN AND FUTURE TRANSMIT TIME. FIRST ENDPOINT TRANSMITS ACOUSTIC SPREAD SPECTRUM SIGNAL AT FUTURE TRANSMIT TIME

1404 — SECOND ENDPOINT RECEIVES ACOUSTIC SPREAD SPECTRUM SIGNAL, DETERMINES FROM RECEIVED SIGNAL RECEIVE TIME, RECOVERS SECOND TOKEN CORRESPONDING TO TOKEN, AND RECOVERS FUTURE TRANSMIT TIME, COMPUTES SEPARATION DISTANCE BETWEEN FIRST AND SECOND ENDPOINTS BASED ON DIFFERENCE BETWEEN RECEIVE TIME AND FUTURE TRANSMIT TIME, AND SENDS TO NETWORK SECOND TOKEN AND COMPUTED SEPARATION DISTANCE

1406 — RECEIVE FROM SECOND ENDPOINT OVER NETWORK SECOND TOKEN AND COMPUTED SEPARATION DISTANCE

1408 — PAIR THE FIRST ENDPOINT WITH THE SECOND ENDPOINT ONLY WHEN SECOND TOKEN MATCHES TOKEN AND COMPUTED SEPARATION DISTANCE IS LESS THAN THRESHOLD DISTANCE

FIG.14

ENDPOINT PROXIMITY PAIRING USING ACOUSTIC SPREAD SPECTRUM TOKEN EXCHANGE AND RANGING INFORMATION

TECHNICAL FIELD

The present disclosure relates to proximity pairing of endpoints using acoustic spread spectrum communications.

BACKGROUND

Room environments are challenging for transmission of information via acoustic signals. This is due to the extreme multi-path nature of an impulse response of the room from the transmission source (loudspeaker) to wherever the capture device (microphone) resides. Although humans are well adapted for this environment, traditional forms of communications (e.g. using acoustic tones and pulses) have difficulty operating reliably in such an environment. As an example, direct path sound may be as much as 20 dB below a sum of reverberant sound (non-direct path sound) when the loudspeaker and the microphone are separated by 30 feet in a typical conference room. Proximity pairing of endpoint devices is used to associate the endpoint devices with each other prior to establishing a communication session between the devices. Proximity pairing involves an exchange of signals between the endpoint devices to be paired, but the exchange of signals often suffers from the extreme multi-path mentioned above, which may prevent appropriate pairing, or possibly result in inappropriate pairing.

BRIEF DESCRIPTION OF THE DRAWINGS

FIG. 14 is a flowchart of a method of pairing endpoints using an acoustic spread spectrum signal for token exchange and ranging information including operations from the method of FIGS. 11 and 12, according to an embodiment.

DESCRIPTION OF EXAMPLE EMBODIMENTS

Overview

In a first embodiment, a first endpoint device generates an acoustic spread spectrum signal including a pilot sequence and a spread data sequence representing a token synchronized to the pilot sequence, transmits the acoustic spread spectrum signal, and records a transmit time at which the acoustic spread spectrum signal is transmitted. A receive time at which a second endpoint device received the acoustic spread spectrum signal transmitted by the first endpoint device is received from the second endpoint device along with an indication of a second token as recovered from the received acoustic spread spectrum signal by the second endpoint device. A separation distance between the first endpoint device and the second endpoint device is computed based on a time difference between the transmit time and the receive time. The first endpoint device is paired with the second endpoint device when the token matches the second token and the computed distance is less than a threshold distance.

In a second embodiment, a first endpoint device generates an acoustic spread spectrum signal including a pilot sequence and a spread data sequence synchronized with the pilot sequence. The spread data sequence encodes both a token and a future transmit time at which the acoustic spread spectrum signal will be transmitted. The first endpoint device transmits the acoustic spread spectrum signal at the future transmit time. A second endpoint device receives the acoustic spread spectrum signal, determines from the received acoustic spread spectrum signal a receive time, a second token corresponding to the token, and the future transmit time. A separation distance between the first endpoint device and the second endpoint device is computed based on a difference between the receive time and the future transmit time, and the second token and the computed separation distance are sent to a network. The second token and the computed separation distance are received from the second endpoint device over the network. The first endpoint device is paired with the second endpoint device when the second token matches the token and the computed separation distance is less than a threshold distance.

Example Embodiments

Figure 1A:
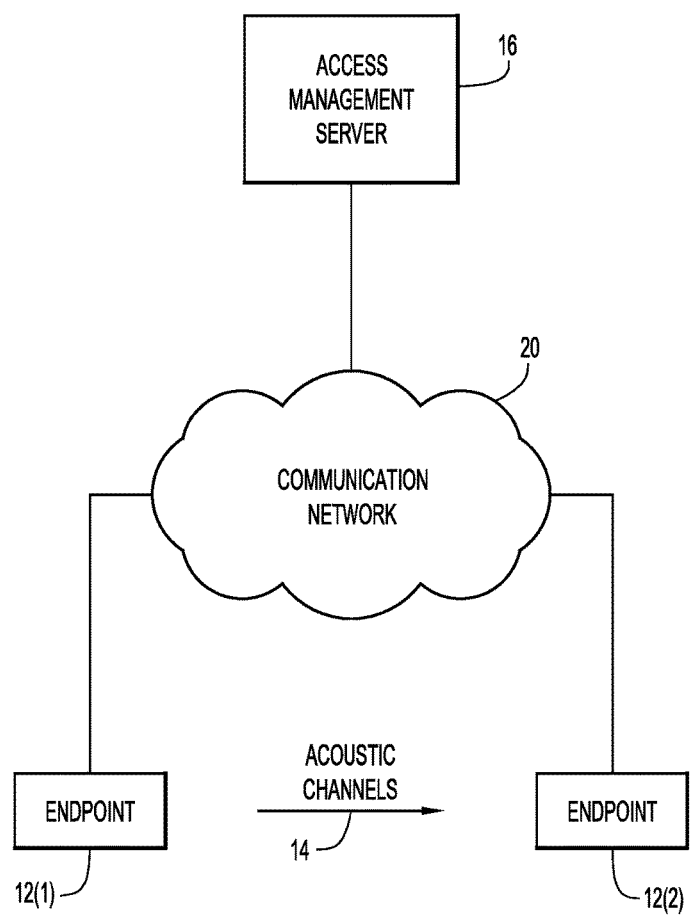
FIG. 1A is an illustration of a communication environment in which embodiments directed to proximity verification using acoustic spread spectrum techniques for token exchange and derivation of ranging information may be implemented.

With reference to FIG. 1A, there is an illustration of a communication environment 10 in which embodiments directed to proximity verification using acoustic spread spectrum techniques for token exchange and ranging information may be implemented. Communication environment 10 includes: a first endpoint device 12(1) equipped for audio/visual communication, such as a video conference device, a voice over Internet Protocol (VOIP) phone, or the like; a second endpoint device 12(2) configured to communicate with the first endpoint device when in range of the first endpoint device over one or more acoustic channels 14, each of the endpoint devices operated by a respective user (not shown in FIG. 1); and an access management server (AMS) 16 (referred to more simply as "management server" 16 or "management entity" 16) that communicates with each of the endpoint devices over a communication network 20 connected with the endpoint devices, and the AMS. Communication network 20 may include one or more of a wired or wireless local area network (LAN) and wired or wireless wide area network (WAN), including the Internet. Network 20 may support a variety of protocols, including, without limitations, the Internet Protocol (IP), the Session Initiation Protocol (SIP), the Hypertext Transfer Protocol (HTTP), and the Real-time Transport Protocol (RTP), and so on. Endpoint devices 12(1) and 12(2) may be deployed in a shared work space or in different rooms in a building, for example. Moreover, endpoints 12 may move between the rooms over time. Communication environment 10 is shown by way of example, only, and it is understood, that the communication environment may support any number of endpoint devices.

Endpoint devices 12(1) and 12(2) (referred to individually as an "endpoint 12" and collectively as "endpoints 12") are each configured to transmit and receive acoustic signals, including acoustic spread spectrum signals. Thus, endpoint 12(2) may communicate with endpoint 12(1) over one or more acoustic channels 14 established between the endpoints. Endpoints 12 may use any known or hereafter developed technique for channelizing audio to create the acoustic channels, such as: Time Division Multiplexing (TDM), in which different time slots are assigned to different channels; Frequency Division Multiplexing (FDM), in which different carrier frequencies or different frequency bands are assigned to different acoustic channels; Code Division Multiplexing, in (CDM), in which different spreading codes, e.g., spread spectrum codes, are assigned to different channels.

Endpoints 12 are considered to be in range of each other if an acoustic signal transmitted by one of the endpoints may be received, detected, and processed by the other endpoint, e.g., when the two endpoints occupy the same room. When in range of each other, endpoints 12 may establish and engage in an audio/visual conference session with each other, and may also communicate with other endpoints (not shown in FIG. 1) over network 20. Once the conference session is established, the participating endpoints, e.g., endpoints 12, exchange information/content over acoustic channels 14, and in turn exchange the information/content with network 20.

According to embodiments presented herein, AMS 16 interacts with endpoint 12(1) and endpoint 12(2) to detect whether endpoint 12(2) is in range of endpoint 12(1) at any given time, and then authenticate endpoint 12(2) based on a token exchange communication protocol implemented by and between the AMS and the endpoints, as will be described in detail below. Once a given endpoint has been authenticated, various operations may be performed with respect to that endpoint. For example, user profile information (e.g., a user phone number and an email address) stored in a centralized user profile database may be downloaded from the database to endpoint 12(1) for subsequent use with respect to the authenticated endpoint (e.g., endpoint 12(2)), such as for receiving and making phone calls via endpoint 12(1). Also, each authenticated endpoint (e.g., endpoint 12(2)) may be assigned, and granted access to, a secure acoustic channel between the given endpoint and endpoint 12(1) and over which the endpoint may exchange information/content during a conference session.

The above-described detecting and authenticating together represent "pairing" of endpoint 12(1) with endpoint 12(2) when in range of each other. Such pairing is also referred to herein as "proximity verification" of endpoints 12 because the pairing verifies the authenticity of the endpoints that are in range of each other (i.e., proximate each other). After proximity verification/authentication, endpoint 12(1) and endpoint 12(1) are referred to as "paired devices" or "paired endpoints."

As mentioned briefly above, endpoints 12 employ acoustic spread spectrum techniques to communicate with each other over one or more acoustic channels 14. Such acoustic spread spectrum techniques are described by way of example below in connection with FIGS. 1B and 2-9. The acoustic spread spectrum techniques form the basis for proximity pairing presented herein. Accordingly, after the spread spectrum techniques have been described below, embodiments directed to proximity pairing will be described in detail in connection with FIGS. 10-14.

Spread Spectrum Techniques

Figure 1B:
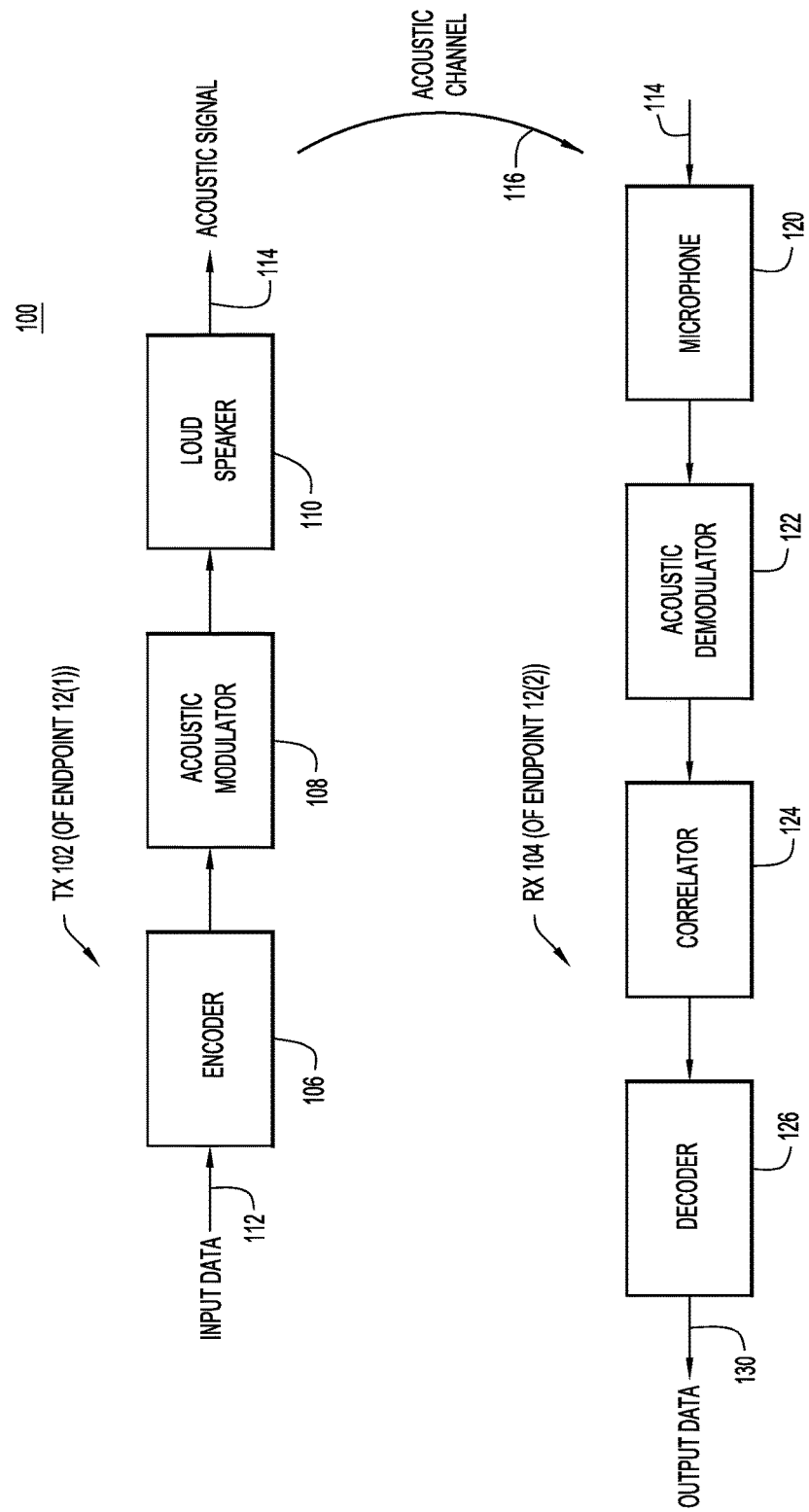
FIG. 1B is a block diagram of an acoustic spread spectrum communication system, including a spread spectrum acoustic transmitter and a spread spectrum acoustic receiver, in which a pilot sequence and data spreading codes based on a Prometheus Orthonormal Set (PONS) may be used, according to an example embodiment.

With reference to FIG. 1B, there is shown a block diagram of an example spread spectrum (SS) acoustic communication system 100 including portions of endpoints 12 in which spreading codes based on the Prometheus Orthonormal Set (PONS) may be used. Communication system 100 includes a spread spectrum acoustic transmitter (TX) 102 of endpoint 12(1) and a spread spectrum acoustic receiver (RX) 104 of endpoint 12(2). Acoustic transmitter 102 includes an encoder 106, an acoustic modulator 108, and a loudspeaker 110 that perform sequential signal processing to convert input data 112 to a spread spectrum acoustic signal 114 that includes a pilot sequence and a spread data sequence that are time synchronized with each other. Loudspeaker 110 transmits acoustic signal 114 over an acoustic channel 116. Acoustic signal 114 may have a frequency spectrum in an audible frequency band of human hearing (e.g., up to 20 kHz), an ultrasound frequency band (e.g., above 20 kHz), or a frequency band that spans both the audible and the ultrasound frequency bands. Acoustic receiver 104 includes a microphone 120, acoustic demodulator 122, a correlator 124, and a decoder 126 that perform sequential signal processing on acoustic signal 114 (when received) to convert the received acoustic signal to output data 130 representative of input data 112.

TX 102 employs spreading codes based on the PONS (referred to as "PONS codes" or "PONS sequences") to generate acoustic signal 114 from input data 112, and RX 102 employs the PONS codes to recover output data 130 from the acoustic signal. The PONS codes are based on Shapiro polynomials, which have coefficients +/−1. That is, each PONS code includes a sequence of coefficients in which each of the coefficients is +/−1. PONS codes are generated based on a PONS construction. The PONS construction expands the Shapiro polynomials via a concatenation rule defined below. Working with sequences formed by the polynomial coefficients, various PONS matrices are as follows.

Starting with:

$$P_1 = \begin{bmatrix} P_{1,1} \\ Q_{1,1} \end{bmatrix} = \begin{bmatrix} 1 & 1 \\ 1 & -1 \end{bmatrix},$$

Concatenation leads to:

$$P_2 = \begin{bmatrix} P_{2,1} \\ Q_{2,1} \\ P_{2,2} \\ Q_{2,2} \end{bmatrix} = \begin{bmatrix} P_{1,1} & Q_{1,1} \\ P_{1,1} & -Q_{1,1} \\ Q_{1,1} & P_{1,1} \\ -Q_{2,2} & P_{1,1} \end{bmatrix} = \begin{bmatrix} 1 & 1 & 1 & -1 \\ 1 & 1 & -1 & 1 \\ 1 & -1 & 1 & 1 \\ -1 & 1 & 1 & 1 \end{bmatrix},$$

and letting $$P_{m-1} = \begin{bmatrix} P_{m-1,1} \\ Q_{m-1,1} \\ \vdots \\ P_{m-1,2^{m-2}} \\ Q_{m-1,2^{m-2}} \end{bmatrix}$$

which is of dimensions $2^{m-1} \times 2^{m-1}$ with each row being one of the $2^{m-1}$ PONS sequences, the $2^m \times 2^m$ PONS matrix is obtained by $$P_m = \begin{bmatrix} P_{m,1} \\ Q_{m,1} \\ P_{m,2} \\ Q_{m,2} \\ \vdots \\ P_{m,2^{m-1}-1} \\ Q_{m,2^{m-1}-1} \\ P_{m,2^{m-1}} \\ Q_{m,2^{m-1}} \end{bmatrix} = \begin{bmatrix} P_{m-1,1} & Q_{m-1,1} \\ P_{m-1,1} & -Q_{m-1,1} \\ Q_{m-1,1} & P_{m-1,1} \\ -Q_{m-1,1} & P_{m-1,1} \\ \vdots & \vdots \\ P_{m-1,2^{m-2}} & Q_{m-1,2^{m-2}} \\ P_{m-1,2^{m-2}} & -Q_{m-1,2^{m-2}} \\ Q_{m-1,2^{m-2}} & P_{m-1,2^{m-2}} \\ -Q_{m-1,2^{m-2}} & P_{m-1,2^{m-2}} \end{bmatrix}.$$

Thus, in one example of a 4×4 PONS matrix:

$$P_{2^2,2^2} = \begin{bmatrix} 1 & 1 & 1 & -1 \\ 1 & 1 & -1 & 1 \\ 1 & -1 & 1 & 1 \\ -1 & 1 & 1 & 1 \end{bmatrix}$$

$$P_{2^2,2^2} * P_{2^2,2^2}^T = 4 * I$$

$$P_{2^K,2^K} * P_{2^K,2^K}^T = 2^K * I$$

and any row/column can be negated and still have $P * P^T = (2^K) * I$.

According to the PONS construction described above, PONS codes are defined in a PONS matrix P having $2^K$ rows and $2^K$ columns of PONS coefficients each equal to +/−1. Each row/column represents a code that may be used (i) to spread input data 112 to produce a spread data sequence that achieves spread spectrum gain, or (ii) directly as a pilot signal (i.e., pilot sequence) having autocorrelation properties useful for pilot synchronization, as described below in connection with FIG. 2. In the ensuing description, the term "PONS eigenvector" may be used synonymously and interchangeably with the terms "PONS code" or "PONS sequence." Thus, a "PONS eigenvector" or simply "eigenvector" refers to a sequence of PONS coefficients.

Figure 2:
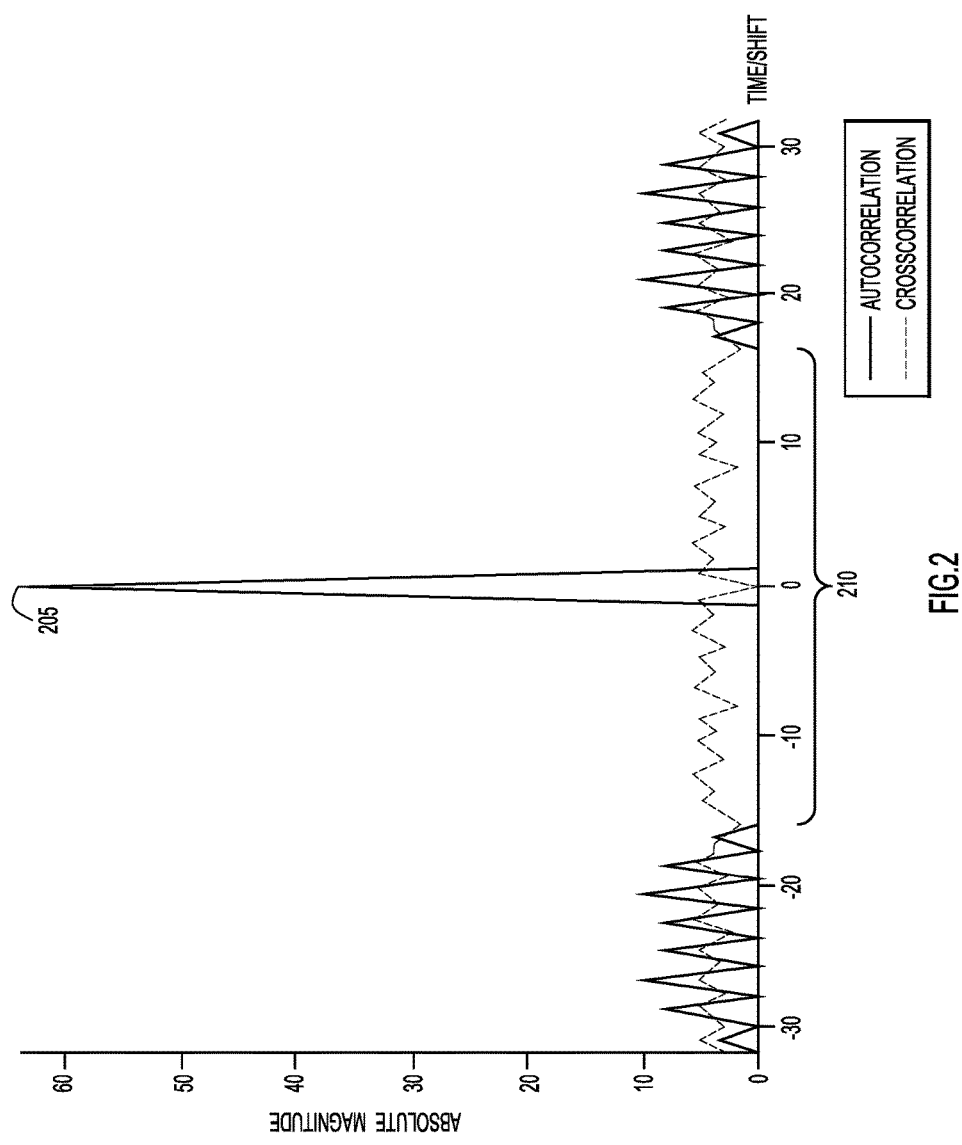
FIG. 2 is an absolute magnitude vs. time-shift plot of PONS cross-correlation and autocorrelation averages for PONS codes or eigenvectors of order $2^K$ where K=6, according to an example embodiment.

With reference to FIG. 2, there is a magnitude vs. time-shift plot of PONS cross-correlation and autocorrelation magnitude amplitude averages for PONS codes or eigenvectors of order $2^K$ where K=6, i.e., defined in the PONS matrix $P_{64,64}$. PONS matrix $P_{64,64}$ defines 64 PONS eigenvectors (rows), each having a length of 64 PONS coefficients (i.e., $2^6$ PONS coefficients). The autocorrelation plot includes an autocorrelation peak 205 at time shift zero (corresponding to when a PONS eigenvector is time-aligned with itself). Autocorrelation peak 205 is centered in time within a relatively wide zero-autocorrelation-zone (ZAZ) 210 equal to ½ the length of the PONS eigenvector. When TX 102 generates acoustic signal 114 so as to include one of the PONS eigenvectors as a pilot sequence, RX 104 exploits ZAZ 210 for pilot sequence synchronization, as described below.

Figure 3:
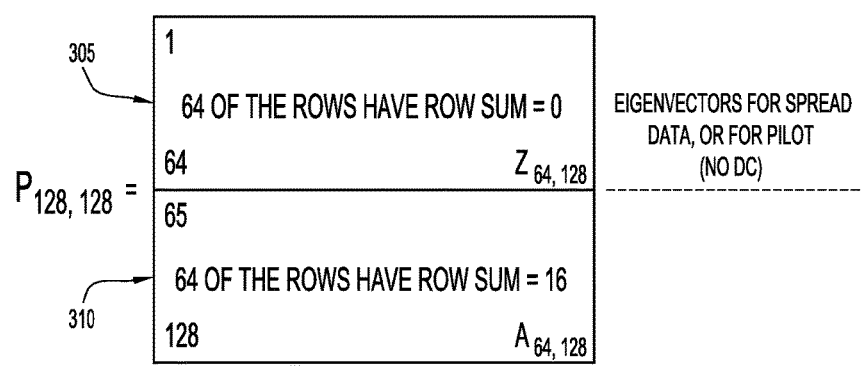
FIG. 3 is an illustration of the PONS matrix $P_{128,128}$, which defines PONS eigenvectors of order $2^7$, according to an example embodiment.

With reference to FIG. 3, there is an illustration of the PONS matrix $P_{128,128}$, which defines PONS eigenvectors of order $2^7$, i.e., K=7. That is, PONS matrix $P_{128,128}$ defines a set of 128 ($2^7$) PONS eigenvectors (rows) each having a length of 128 PONS coefficients. The set of 128 PONS eigenvectors is divided in half into a first half/subset 305 of PONS eigenvectors and a second half/subset 310 of PONS eigenvectors. Each PONS eigenvector in first half 305 includes 128 PONS coefficients that sum together to a value of zero. These PONS eigenvectors are referred to as "zero-sum" eigenvectors. Each PONS eigenvector in second half 310 includes 128 PONS coefficients whose row elements sum together to a value of 16. This exemplifies a general property of the PONS construction, which, when K is odd (e.g., K=7 for PONS matrix $P_{128,128}$), half of the PONS eigenvectors in the corresponding PONS matrix P are zero-sum PONS eigenvectors, while the other half are not. The zero-sum and the non-zero sum PONS eigenvectors may be used both as pilot sequences and to spread input data to produce spread data sequences; however, it is advantageous to use the zero-sum PONS eigenvectors because their use eliminates a direct current (DC) component from the resulting pilot sequences and spread data sequences. The use of zero-sum eigenvectors is thus especially useful for baseband (i.e., non-modulated) implementations of this invention.

Another property of zero-sum PONS eigenvectors exploited in embodiments presented herein is that the zero-sum PONS eigenvectors are timewise orthogonal to each other across different eigenvector lengths that are odd powers of 2 (i.e., across lengths of $2^K$, where K takes on a range of odd values). For example, there are many subsets of 4 concatenated PONS eigenvectors each of length $2^9$, when time-aligned with a specific PONS eigenvector of length $2^{11}$, are each orthogonal to the longer PONS eigenvector. The longer PONS eigenvector is referred to as a pilot eigenvector and the shorter PONS eigenvector subset is referred to as a user or data eigenvector for reasons to be apparent shortly. The timewise orthogonality of carefully crafted subsets occurs over many different pairs of odd powers of two, such as pairs of lengths including $2^{13}/2^{11}$, $2^{11}/2^9$, and $2^9/2^7$. Orthogonality also occurs across odd powers of two greater than two, such as $2^{13}/2^9$. The design of such user eigenvector subsets is outside the scope of the present invention and is not described here. An example of such orthogonality will be described in connection with FIG. 6.

Figure 4:
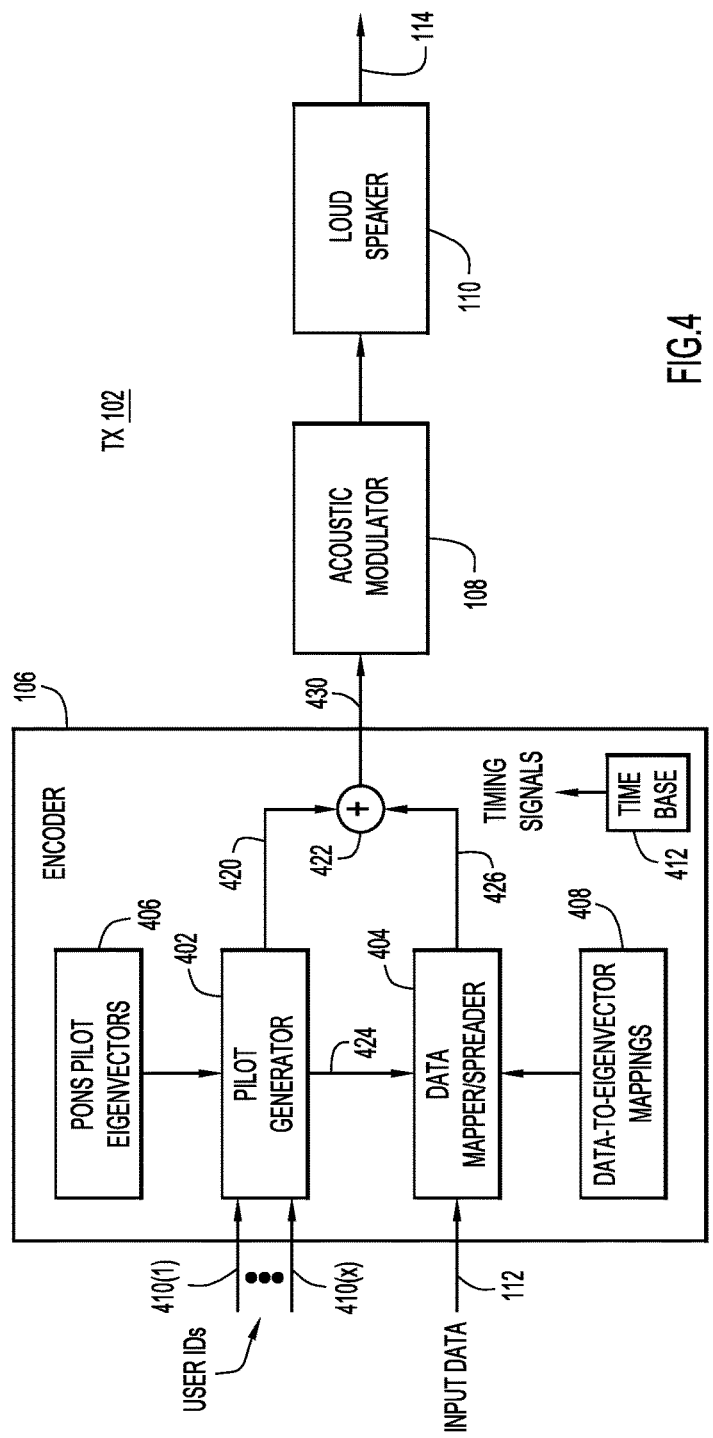
FIG. 4 is a block diagram of the spread spectrum acoustic transmitter that expands on an encoder of the transmitter, according to an example embodiment.

With reference to FIG. 4, there is a block diagram of TX 102 that shows details of encoder 106, according to an embodiment. Encoder 106 includes a pilot generator 402 and a data mapper/spreader 404. Encoder 106 stores PONS pilot eigenvectors 406 in a memory of TX 102 (not shown), each of which may be used to generate a pilot sequence for spread spectrum synchronization. Encoder 106 also stores in the memory data-to-eigenvector mappings 408 configured to map multi-bit words of input data 112 to PONS data eigenvectors (also referred to as "user eigenvectors" because they are used to spread user data) based on the values of the multi-bit words, such that each mapping uniquely maps a respective one of the multi-bit words to a corresponding one of the PONS data eigenvectors. Thus, each PONS data eigenvector represents a spread version of its mapped multi-bit word in order to achieve spread spectrum gain in communication system 100 (assuming each bit of the multi-bit word corresponds to multiple PONS coefficients).

Pilot generator 402 receives distinct user identifiers (IDs) 410(1)-410(X) to identify different users and selects a PONS pilot eigenvector from PONS pilot eigenvectors 406 corresponding to one of the user identifiers. In this way, pilot generator 402 may select different ones of PONS pilot eigenvectors 406 corresponding to different ones of user identifiers 410(1)-410(X). In accordance with pilot generator timing signals synthesized by a time base 412, pilot generator 402 generates/outputs the selected pilot eigenvector as a pilot sequence 420 that extends across a pilot frame, such that the pilot sequence begins and ends where the pilot frame begins and ends in time, respectively. Pilot generator 402 provides pilot sequence 420 to a mixer 422. Pilot generator 402 also provides to data mapper/spreader 404 a timing or synchronization signal 424 representative of the pilot generator timing used to generate pilot sequence 420, i.e., representative of the pilot frame.

Data mapper/spreader 404 receives input data 112, groups the input data as it arrives into multi-bit words or "tokens," and maps each of the multi-bit words (i.e., tokens) to a corresponding data eigenvector based on data-to-eigenvector mappings 408. Data mapper/spreader 404 outputs the corresponding data eigenvectors in sequence as a spread data sequence 426 based on synchronization signal 424, such that the sequence of data eigenvectors collectively spans and is time-aligned (i.e., synchronized) with pilot sequence 420 (i.e., with the pilot frame). The output data eigenvectors span/occupy respective sequential data frames that are time-aligned with the pilot frame, such that a first one of the data eigenvectors/data frames in the sequence of data eigenvectors/data frames begins where pilot sequence 420 (i.e., the pilot frame) begins, and a last one of the data eigenvectors/data frames ends where the pilot sequence/pilot frame ends in time. Mixer 422 mixes pilot sequence 420 with spread data sequence 426 (i.e., the sequence of data eigenvectors spanning the pilot frame) to produce a spread spectrum baseband signal 430 that includes the pilot sequence and the data eigenvectors time-aligned or synchronized with each other. In addition, based on synchronization signal 424 and the timing signals from time base 412, encoder 106 records times at which the pilot frame begins and ends, and times at which each of the data frames synchronized with the pilot frame begins and ends, and makes the recorded times available for other processing, described below in connection with FIGS. 10-14. The recorded times may be represented as digital words having a sub-millisecond resolution for example. Over time as encoder 106 receives input data 112, pilot generator 402 and data mapper/spreader 404 repeatedly perform their respective operations described above to generate time-aligned pilot sequences and spread data sequences.

Acoustic modulator 108 and loudspeaker 110 together generate acoustic signal 114 from baseband signal 430 and transmit the acoustic signal over acoustic channel 116. Acoustic modulator 108 can move the frequency spectrum occupied by acoustic signal 114 arbitrarily in frequency via amplitude modulation, although other forms of narrowband modulation are possible (e.g., low-index frequency or phase modulation). In an example, acoustic modulator may include an up-sampler followed by a root raised cosine filter.

Figure 5:
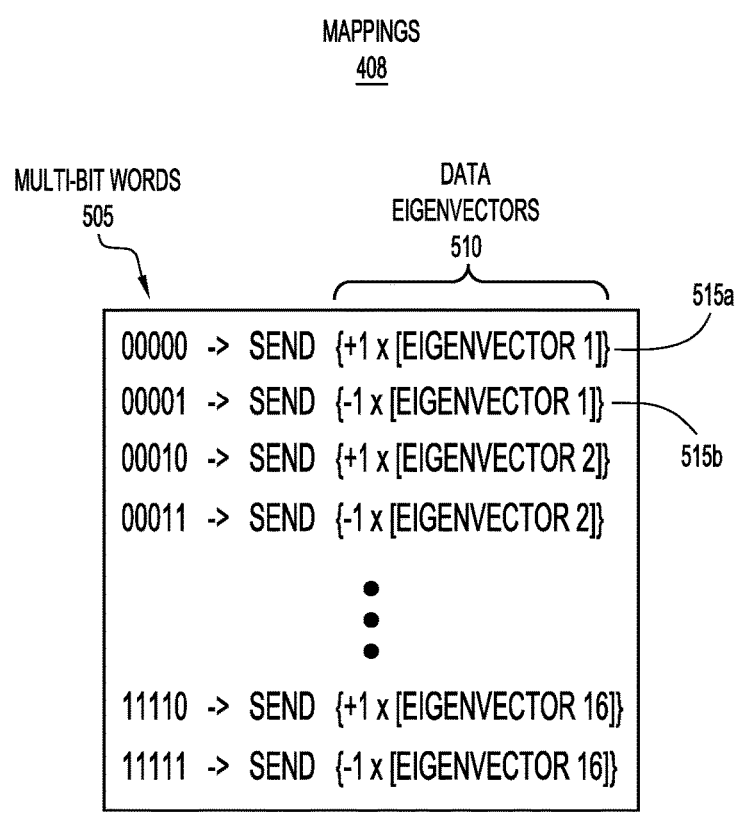
FIG. 5 is an illustration of data-to-eigenvector mappings used in the spread spectrum acoustic transmitter, according to an embodiment.

With reference to FIG. 5, there is an illustration of example data-to-eigenvector mappings for mappings 408. In the example of FIG. 5, mappings 408 include 32 5-bit words 505 (0000-11111) mapped to corresponding ones of 32 data eigenvectors 510. Each data eigenvector (e.g., data eigenvector 515a) has a corresponding data eigenvector (e.g., 515b) that is a negated version of the data eigenvector (e.g., of data eigenvector 515a). Thus, data eigenvectors 510 include a first subset of 16 data eigenvectors and a second subset of 16 data eigenvectors for a total of 32 data eigenvectors, where each data eigenvector in the second subset is a negated version of a corresponding one of the data eigenvectors in the first set.

In the example of FIG. 5, the 16 possible positive data eigenvectors (choices) yields 32 different possible data eigenvectors (i.e., the 16 positive data eigenvectors and their negatives) to mix with pilot sequence 420. All of the 32 data eigenvectors can be uniquely resolved at RX 104. Because 32 data eigenvectors translates to $2^5$ possibilities, encoder 106 can take 5 bits (i.e., a 5-bit word) and, dependent on the value of the bits, send one of the 32 data eigenvectors to RX 104. Upon reception of the one of the data eigenvectors, RX 104 can map-back to the 5 bits. The process performed at RX 104 will be described more fully below in connection with FIG. 7.

More generally, each data eigenvector of data-to-eigenvector mappings 408 is a PONS eigenvector of order $2^M$ (M is odd), and each pilot eigenvector of PONS pilot eigenvectors 406 is a PONS eigenvector of order $2^{M+K}$ (K is even and >0). In an example, K=2. As mentioned above, use of pilot eigenvectors and data eigenvectors having respective lengths that are different odd powers of 2 ensures that any chosen pilot eigenvector is timewise orthogonal with any of the specially designed subsets of data eigenvectors when a specific pilot eigenvector is aligned with the data eigenvector. As a result, in FIG. 4, pilot sequence 420 (representing the pilot eigenvector selected from PONS pilot eigenvectors 404 according a given user ID 410(i)) is orthogonal to each of the data eigenvectors in spread data sequence 426 time-aligned with the pilot sequence.

Figure 6:
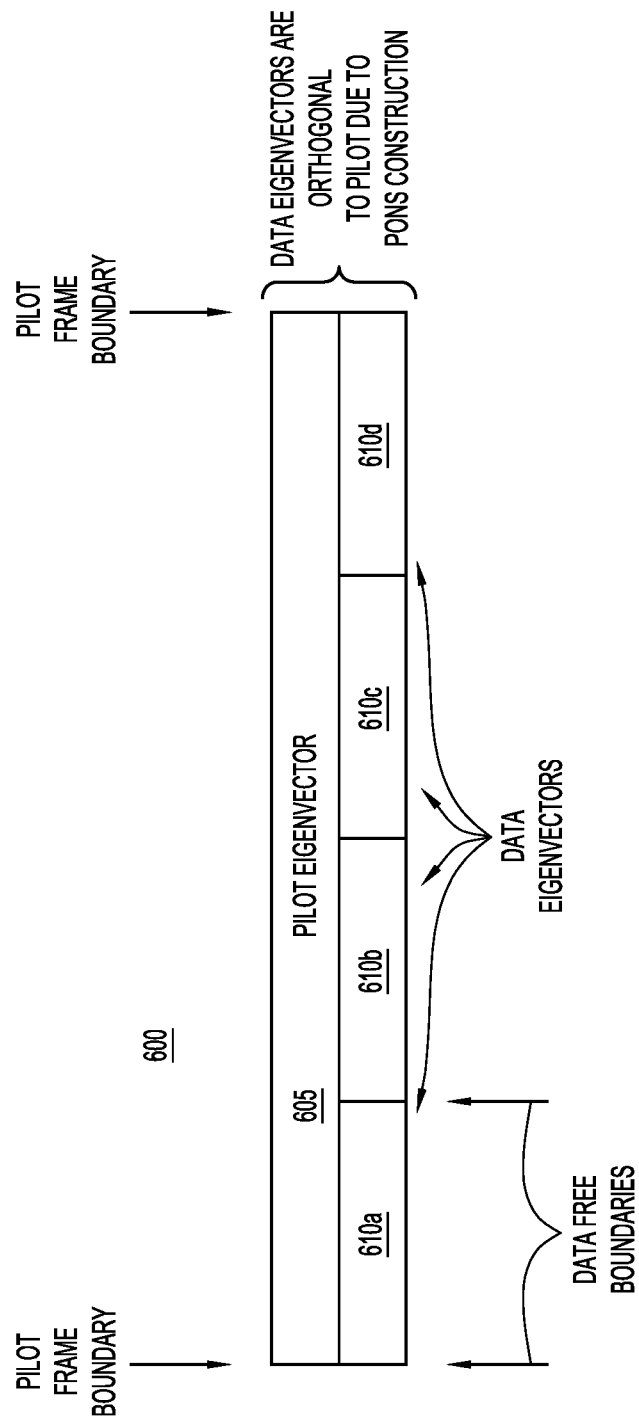
FIG. 6 is an illustration of a timing relationship between a PONS pilot eigenvector and a sequence of PONS data eigenvectors generated by the spread spectrum acoustic transmitter, according to an embodiment.

With reference to FIG. 6, there is an illustration of an example timing relationship 600 between a pilot sequence 605 (the selected pilot eigenvector) and a sequence of contiguous data eigenvectors 610a, 610b, 610c, and 610d as would exist in baseband signal 430 and correspondingly in acoustic signal 114. Pilot sequence 605 spans a pilot frame and each of data eigenvectors 610i spans a respective data frame in acoustic signal 114. In the example of FIG. 6, each data eigenvector 610i is of order $2^9$ (length=512 coefficients), while pilot eigenvector 605 is of order $2^{11}$ (length=2048 coefficients, or 4 times the length of the data eigenvector). With the illustrated timing relationship in which the full extent of data eigenvectors 6105a-610d begins an ends in time alignment with pilot eigenvector 605, and due to the properties of the PONS construction (and pilot selection and user eigenvector subset selection), each data eigenvector 610i is orthogonal to the portion of the pilot eigenvector of the same length. Such orthogonality advantageously simplifies decoding of acoustic signal 114 at RX 104 because the pilot sequence need not be removed/subtracted from the acoustic signal prior to it being decoded.

In the example of FIG. 6, there is a minimum difference in odd powers of two between pilot sequence 605 and data eigenvectors 610 (which is 2, such as $2^{11}/2^{9}$), which yields the largest possible ZAZ for the data eigenvectors. If there is reverberation in a room in which communication system 100 is deployed resulting in data eigenvector reflections within the ZAZ of the data eigenvector, such reflections will be cancelled at RX 104. Reverberations outside of the ZAZ of the data eigenvector appear as uncorrelated noise. As long as there is sufficient spread spectrum gain (due to data spreading) to overcome the uncorrelated noise, it will be possible for RX 104 to decode individual data eigenvectors. Thus, communication system 100 exploits both the ZAZ property of the PONS codes and spread spectrum gain to overcome room reflections and reverberation.

Figure 7:
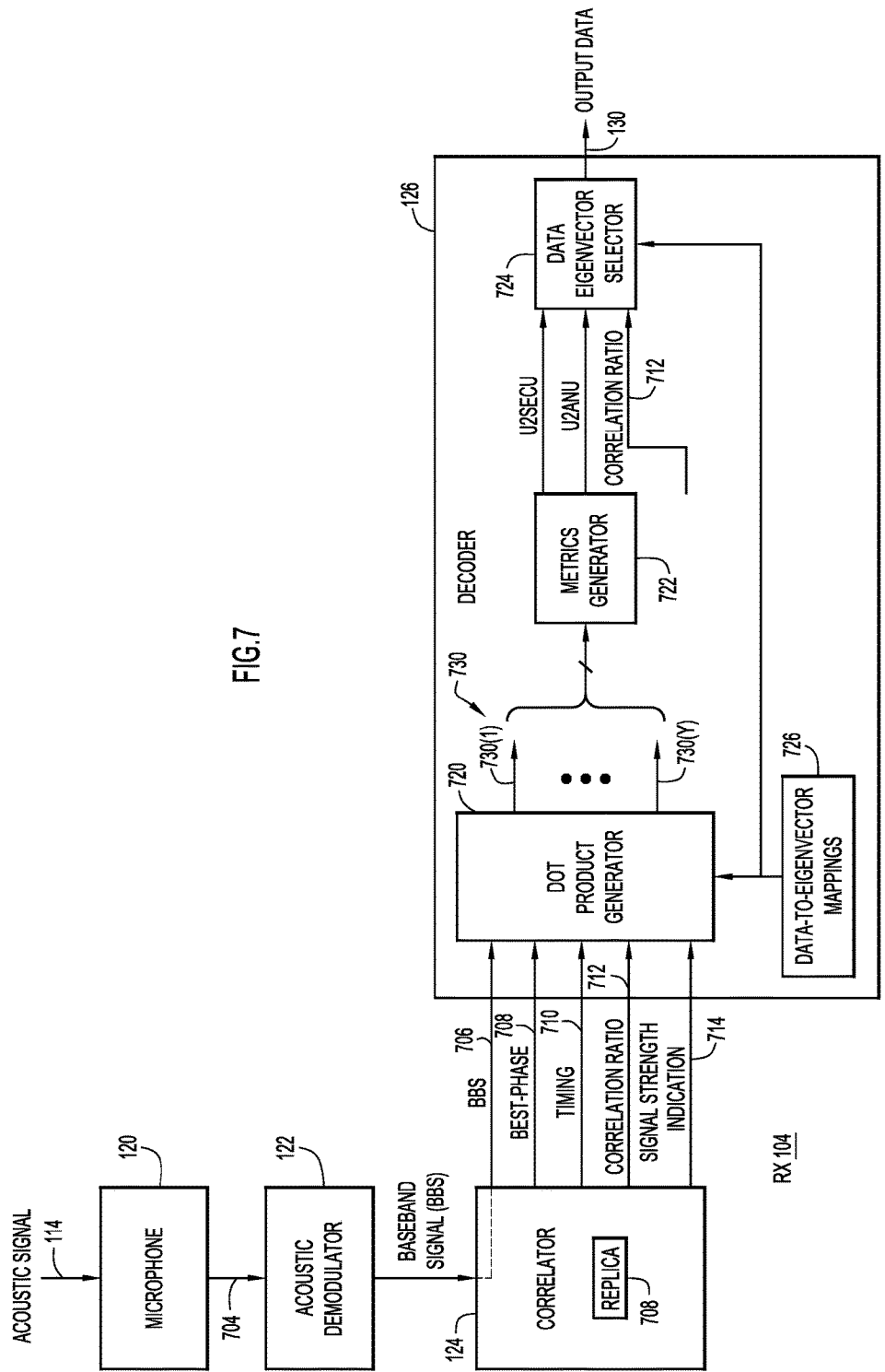
FIG. 7 is a block diagram of the spread spectrum acoustic receiver that expands on a decoder of the receiver, according to an embodiment, according to an embodiment.

With reference to FIG. 7, there is a block diagram of RX 104 that expands on decoder 126, according to an embodiment. When RX 104 receives acoustic signal 114, microphone 120 detects acoustic signal 114 to produce detected acoustic signal 704. Acoustic demodulator 122 demodulates detected acoustic signal 704 to produce a baseband signal 706, and provides the baseband signal to correlator 124. In an example, acoustic demodulator includes a root raised cosine filter followed by a down-sampler. Correlator 124 correlates baseband signal 706 with a replica 708 of the pilot eigenvector selected by pilot generator 402 and used to generate pilot sequence 420 in TX 102, to produce correlation amplitudes that are used to detect the presence of the pilot sequence (i.e., the selected pilot eigenvector) in baseband signal 706. Correlator 124 detects the pilot sequence as a correlation peak (i.e., an autocorrelation peak) among the correlation amplitudes. The magnitude (level) of the autocorrelation peak relative to the non-peak values defines a quality of "lock" of correlator 124 on the pilot sequence (e.g., lower amplitude corresponds to lower quality lock or even failure to lock, and vice versa).

Correlator 124 also derives (i) a best sampling phase 708 for sampling baseband signal 706, and (ii) a timing signal 710 indicative of pilot frame timing and thus data frame timing (e.g., the time position of the pilot and data frames in baseband signal 706) based on the detected autocorrelation peak magnitude. Timing signal 710 may include digital time words having sub-millisecond resolution/accuracy that are representative of various receive times associated with baseband signal 706, such as times for the pilot sequence and data frame boundaries in the baseband signal, and the autocorrelation peak. Timing signal 710 may be provided to other processing discussed below in connection with FIGS. 10-14. Correlator 124 provides best sampling phase 708, timing signal 710, and baseband signal 706 to decoder 126. Correlator 124 may also derive a correlation ratio metric 712 indicative of whether correlator 124 has detected and locked-onto the pilot sequence. A correlation ratio (value) below a predetermined correlation ratio threshold indicates that correlator 124 has detected and locked-onto the pilot sequence, while a correlation ratio equal to or above the correlation ratio threshold indicates that the correlator has not detected and locked-onto the pilot sequence.

The quality of lock, as indicated by the correlation ratio, is described briefly. When an acoustic space, such as a room, in which RX 104 is deployed is sounded with an acoustic signal that includes only a pilot sequence (i.e. no data eigenvector is mixed with the pilot sequence), correlator 124 produces a cross-correlation result that is a smoothed version of the impulse response of the room. RX 104 locks-on to energy from a dominant signal path, even if that energy is a time-delayed version of a direct signal path. However, whenever the direct signal path and the dominant signal path deliver energy of similar magnitudes, the time difference between the two paths is generally no more than about 10 milliseconds. For this reason, the quality of lock is given by an inverse ratio of a peak absolute magnitude of the cross-correlation to a secondary peak absolute magnitude which occurs in a region of 50 milliseconds to 10 milliseconds before the peak absolute magnitude occurs. In an embodiment, this is the above-mentioned correlation ratio. The 50 to 10 millisecond region is within the ZAZ of the pilot sequence (i.e., when no data eigenvector is present, the secondary peak absolute magnitude should be zero, and thus the correlation ratio is zero).

The correlation ratio takes into account pilot sequence power relative to spread data sequence power and a length of the pilot sequence relative to that of the data eigenvectors. The correlation ratio, in the absence of any noise is well below 0.2. The correlation ratio can degrade (i.e., increase) due to room reverberation (aka multi-path in other disciplines) and other room noise. A correlation ratio below 0.75 is adequate to determine a quality lock in highly reverberant rooms.

In addition to the correlation ratio metric, another signal-strength metric may optionally be generated from the cross-correlation peak. Using similar methodology to the correlation ratio metric, an average power is computed from the samples in the region 50 milliseconds to 10 milliseconds before the peak by summing the squared value of those samples and dividing by the number of those samples. A signal strength metric can be formed by the power of the cross-correlation peak (its squared value) divided by the average power found in the 50 to 10 millisecond region. Such a metric, expressed in dB, has been useful in determining how strong the received signal is in comparison to the received noise. The optional signal-strength metric is depicted as signal strength indication 714 in FIG. 7, and may be used in conjunction with the correlation ratio metric.

Decoder 126 derives/recovers output data 130 from baseband signal 706 based on best sampling phase 708 and timing signal 710. Decoder 126 operates as a data despreader/demapper because it performs operations reverse to those performed by data mapper/spreader 404. In one embodiment, decoder 126 recovers output data 130 from baseband signal 706 in the presence of the pilot sequence, i.e., without removing the pilot sequence from the baseband signal. This is practically achievable because the time-aligned pilot sequence and data eigenvectors representing the output data are orthogonal to each other based on the PONS construction. In another embodiment, decoder 126 (or correlator 124) removes/subtracts the pilot sequence from baseband signal 706 before the decoder recovers output data 130, i.e., the output data is recovered in the absence of the pilot sequence.

Decoder 126 includes a dot-product generator 720, a metrics generator 722, a data eigenvector selector 724, and data-to-eigenvector mappings 726 stored in a memory of RX 104 (not shown), which are copies of mappings 408 in TX 102. For each data frame spanned by the pilot frame in baseband signal 706, dot-product generator 720 performs a respective dot-product operation between each data eigenvector in mappings 726 and the signal energy in the data frame, to produce respective ones of dot-product amplitudes 730 indicative of respective similarities between the signal energy and the corresponding data eigenvectors (e.g., the higher the dot-product amplitude the more similar are the signal energy and the corresponding eigenvector) for that data frame. Dot-product amplitudes 730 are also referred to as "eigenvector projections." For example, dot-product generator 720 performs: a first dot-product operation between a first data eigenvector in mappings 726 and the data frame, to produce a first dot-product amplitude 730(1) indicative of a similarity between the energy in the data frame and the first data eigenvector; a second dot-product operation between the data frame and a second data eigenvector in mappings 726, to produce a second dot-product amplitude 730(2) indicative of a similarity between the energy in the data frame and the second data eigenvector; and so on across Y data eigenvectors in mappings 726. More generally, dot-product generator 720 projects each of the data eigenvectors in mappings 726 onto the energy in the data frame (which is simply a time segment of baseband signal 706 equal to a length of a data eigenvector) to produce respective projected amplitudes 730 indicative of similarity. Although the pilot sequence may contribute undesired energy to the data frame, the undesired energy does not contribute to any of the projected amplitudes due to orthogonality between the pilot sequence and each of the projected data eigenvectors. Other operations besides dot-product operations may be used to generate such projections/amplitudes indications of similarity.

In the absence of any noise, all of the energy/power in the data frame should project on the data eigenvector that occupies the data frame (as inserted by encoder 106). To the extent that the projection onto other data eigenvectors in the set of data eigenvectors yields significant energy in those eigenvector projections, this indicates imperfect reception. In the limit, when noise is sufficient to overcome an ability of RX 104 to recover the data eigenvectors from acoustic signal 114, the projected energy is spread equally over all possibilities/data eigenvectors. Accordingly, metrics generator 722 generates two power metrics used to determine a level of confidence that a highest one of the eigenvector projections represents a correct data eigenvalue.

Metrics generator 722 computes the two confidence metrics based on eigenvector projections 730 as now described. Metrics generator 722 determines a largest eigenvector projection P(Largest) and a next largest eigenvector projection P(Next_Largest) among eigenvector projections 730. Metrics generator 722 also computes an average $P_{AVG}$ of all eigenvector projections 730 except the P(Largest) projection. Metrics generator 722 computes a first power metric "user-to-next largest ratio" U2SecU, in dB, which is a ratio of largest eigenvector projection P(Largest) to next largest eigenvector projection P(Next_Largest), as follows:

$$U2SecU=10*\log_{10}[P(\text{Largest})/P(\text{Next\_Largest})].$$

Metrics generator 722 computes a second power metric "user-to-average-non-user ratio" U2ANU, in dB, which is a ratio of largest eigenvalue projection P(Largest) to average $P_{AVG}$, as follows:

$$U2ANU=10*\log_{10}[P(\text{Largest})/P_{AVG}].$$

Metrics generator 722 provides the first and second power metrics to data eigenvector selector 724.

Data eigenvector selector 724 receives power metrics U2SecU and U2ANU, and may also receive correlation ratio 712. In an embodiment, selector 724 tests whether power metric U2SecU is above a first predetermined threshold and whether second power metric U2ANU is above a second predetermined threshold. If both tests pass, then data selector 724 selects the data eigenvector among mappings 726 whose dot-product resulted in largest eigenvector projection P(Largest) as a best match to the energy in the data frame, and outputs the multi-bit word mapped to that (best matched) data eigenvector in mappings 726. If both tests do not pass, then data selector 724 does not select one of the data eigenvectors from mappings 726 and does not output any multi-bit word.

In another embodiment, selector 724 tests whether power metric U2SecU is above the first predetermined threshold, whether second power metric U2ANU is above the second predetermined threshold, and whether the correlation ratio is below the correlation ratio threshold (mentioned above). If all three tests pass, then data selector 724 selects the data eigenvector among mappings 726 whose dot-product resulted in largest eigenvector projection P(Largest) as a best match to the energy in the data frame, and outputs the multi-bit word mapped to that data eigenvector. If all three tests do not pass, then data selector 724 does not select one of the data eigenvectors from mappings 726 and does not output any multi-bit word. In an example, the first threshold is 2 dB, the second threshold is 11 dB, and the correlation ratio threshold is 0.7, although other values for these thresholds may be used.

Decoder 126 repeats its above-described operations for each data frame in the pilot frame to recover respective multi-bit words for each of the data frames. Decoder 126 repeats this process over time for each received pilot frame.

Communication system 100 relies on spread spectrum gain and the PONS code ZAZ properties to overcome room acoustics. The PONS codes used for the pilot eigenvector and data eigenvectors as described above allows for successful decode when the desired signal is well below the noise (i.e., at negative SNRs). For example, a −6 dB in-band signal-to-noise ratio (SNR) has been attained using pilot sequence/data eigenvector orders $2^{11}/2^9$ (and a pilot to data amplitude ratio of 60%). If it is desired to improve correct decoding of the transmitted acoustic signal at a close distance, while a listener at a further distance is not necessarily able to be decoded correctly, a lower spread spectrum gain (i.e., lower-order spreading codes) may be used. The converse is also possible (higher spread spectrum gain with larger order spreading codes). Thus, communication system 100 may advantageously "tune spreading as a function of expected reverberation."

Communication system 100 may be used in shared work spaces because multiple ones of the communication systems can exist in the same room/volume if different pilot sequences (pilot eigenvectors) are used by the different communication systems and different communication systems are sufficiently closely synchronized in time. This can be achieved using different ones of user IDs 410. Since the speed of sound is relatively slow relative to radio waves, this is possible using services, such as running the Network Time Protocol (NTP), on different components of the communication systems.

The embodiments presented herein provide many advantages.

a. The embodiments employ spread spectrum gain to overcome room reverberation in all spaces/rooms of interests (e.g., rooms not requiring presenter amplification). This allows for decoding of the dominant energy path signal in the presence of much larger reverberant energy.
b. The embodiments, by using the same code construction for both the pilot and spread data sequences/signals, render the pilot signal orthogonal to the spread data signal which allows for a simple decoder design.
c. The embodiments, by using spreading codes with large ZAZs, effectively render to zero early reflection energy within the ZAZ in comparison to other types of spreading codes in systems that do not employ such large ZAZ spreading codes.
d. The embodiments, by using pilot signals with ZAZs, allow for the creation of a robust synchronization metric (e.g., correlation ratio), which is advantageous for acoustic environment applications.
e. The codes employed by the embodiments, being a power of two based construction, can be designed to have any desired spread spectrum gain; allowing the embodiments to be tailored to low spread spectrum gain to high spread spectrum gain designs/applications.
f. Multiple communication systems, via pilot code design, can be made to operate in the same room volume—allowing for shared workspace designs.

Figure 8:
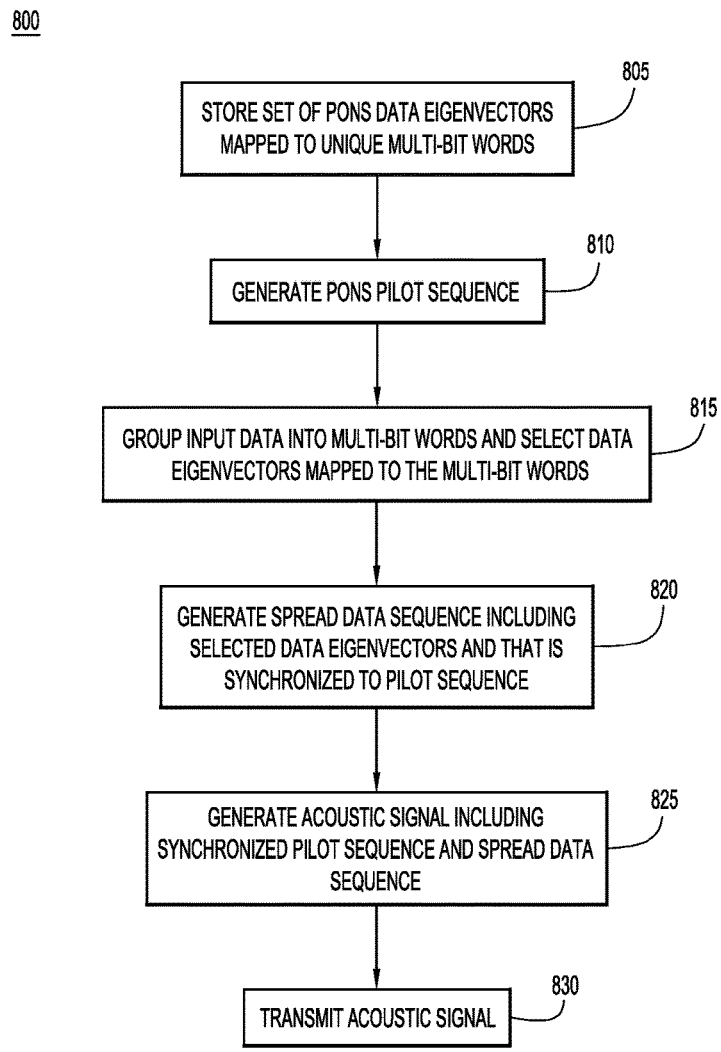
FIG. 8 is a flowchart of a transmit method performed by the spread spectrum acoustic transmitter, according to an example embodiment.

With reference to FIG. 8, there is a flowchart of an example transmit method 800 performed by TX 102.

At 805, TX 102 stores a set of data eigenvectors in mappings 408 that are based on the Prometheus Orthonormal Set (PONS) code construction and orthogonal to each other, wherein each of the data eigenvectors is mapped to a unique multi-bit word.

At 810, TX 102 generates pilot sequence 420 representing a selected pilot eigenvector that is also based on the PONS construction and orthogonal to each of the data eigenvectors.

At 815, TX 102 groups input data 112 into multi-bit words and selects ones of the data eigenvectors mapped to the multi-bit words. Input data 112 may include multi-bit tokens from AMS 16.

At 820, TX 102 generates spread data sequence 426 including the selected ones of the data eigenvectors and that is synchronized to pilot sequence 420.

At 825, TX 102 generates acoustic signal 114 including synchronized pilot sequence 420 and spread data sequence 426. TX 102 records start and stop times for the pilot sequence and the data frames.

At 830, TX 102 transmits acoustic signal 114, and may generate and record one or more transmit times for transmitted acoustic signal 114. The one or more transmit times may include the recorded start and stop times for the pilot sequence and the data frames. Additionally, TX 102 may add to the recorded start and stop times calibrated time delays introduced by acoustic modulator 108 and/or loudspeaker 110 acoustic modulator, to produce the one or more transmit times as time-delayed versions of the recorded start and stop times.

Figure 9:
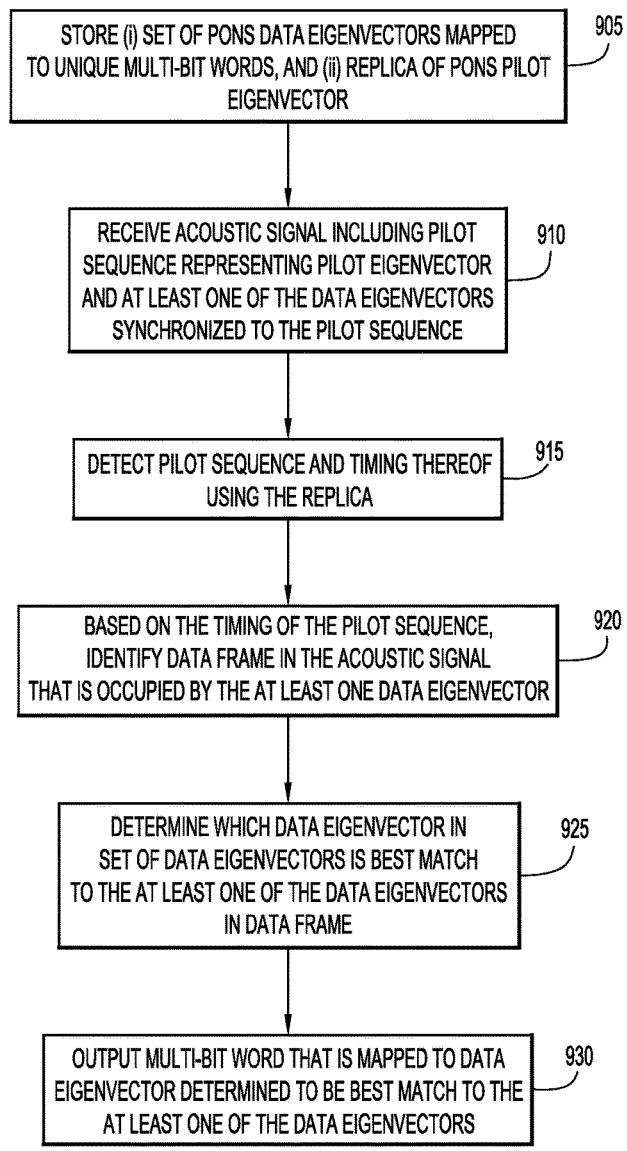
FIG. 9 is a flowchart of a receive method performed by the spread spectrum acoustic receiver, according to an example embodiment.

With reference to FIG. 9, there is a flowchart of an example receive method 900 performed by RX 104.

At 905, RX 104 stores (i) a set of data eigenvectors in mappings 726 that are based on the Prometheus Orthonormal Set (PONS) code construction and orthogonal to each other, wherein each of the data eigenvectors is mapped to a unique multi-bit word, and (ii) replica 708 of a pilot eigenvector that is also based on the PONS and is orthogonal to each of the data eigenvectors.

At 910, RX 104 receives acoustic signal 114 including a pilot sequence representing the pilot eigenvector and at least one of the data eigenvectors synchronized to the pilot sequence.

At 915, RX 104 detects the pilot sequence and its associated timing using replica 708.

At 920, RX 104 identifies a data frame in the acoustic signal that is occupied by the at least one data eigenvector based on the timing of the detected pilot sequence. RX 104 also records times of the detected pilot sequence, autocorrelation peak, and the data frame.

At 925, RX 104 determines which data eigenvector in the set of data eigenvectors is a best match to the at least one of the data eigenvectors in the data frame.

At 930, RX 104 outputs the multi-bit word that is mapped to the data eigenvector determined to be the best match to the at least one of the data eigenvectors.

Proximity Pairing Embodiments

Having described spread spectrum techniques in detail above, proximity pairing embodiments that employ the spread spectrum techniques to exchange tokens and derive ranging information used for the pairing are now described in connection with FIGS. 10-14.

Figure 10:
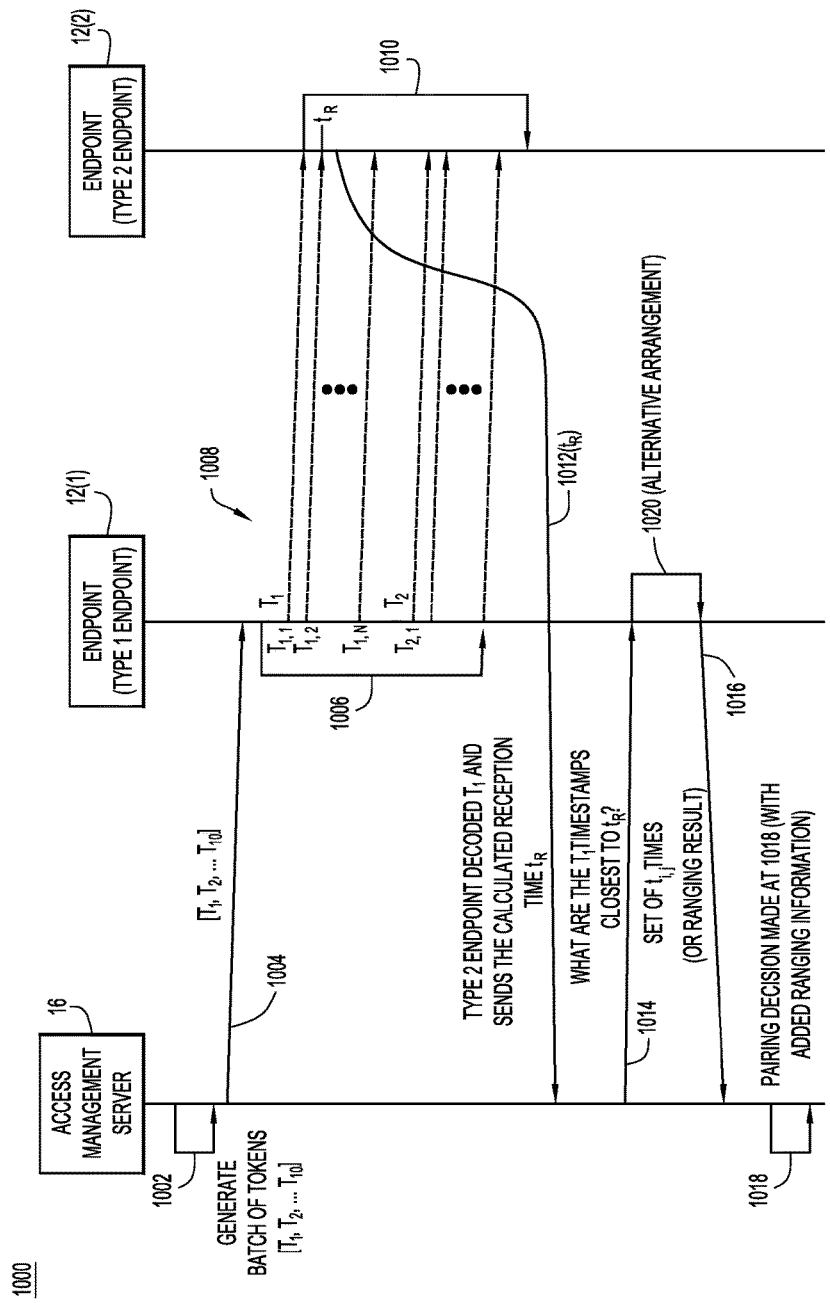
FIG. 10 is a transaction diagram by which proximity verification/authentication using an acoustic spread spectrum signal for token exchange and ranging information is achieved in the environment of FIG. 1A, according to a first embodiment.

With reference to FIG. 10, there is an example transaction diagram 1000 by which proximity verification/authentication using acoustic spread spectrum techniques for token exchange and ranging information is achieved in environment 10, according to a first embodiment. Transaction diagram 1000 shows messages exchanged between AMS 16, endpoint 12(1) (referred to as a "type 1 endpoint"), and endpoint 12(2) (referred to as a "type 2 endpoint"). AMS 16 communicates with each of endpoints 12 over network 20, while endpoints 12 communicate with each other over one or more acoustic channels 14. It is assumed that endpoints 12 are in acoustic range of each other, e.g., in the same room.

At 1002, AMS 16 generates a batch of tokens $T_1$-$T_{10}$ to be used for proximity verification.

At 1004, AMS 16 sends to endpoint 12(1) over network 20 one or more messages carrying tokens $T_1$-$T_{10}$.

At 1006, in response to receiving tokens $T_1$-$T_{10}$ from AMS 16, endpoint 12(1) employs the operations described above in connection with method 800 to generate and transmit acoustic spread spectrum signals that convey tokens $T_1$-$T_{10}$. Specifically, endpoint 12(1):
a. generates a first acoustic spread spectrum signal including a respective pilot sequence and a respective spread data sequence representing token $T_1$ synchronized to the pilot sequence. In an example, with reference again to FIG. 6, the pilot sequence may include pilot eigenvector 605, while the token may be encoded as one of data eigenvectors 610$i$;
b. repeatedly transmits the first spread spectrum signal (conveying first token $T_1$) N times at successive/sequential transmit times $t_{1,1}$-$t_{1,N}$, where $t_{i,j}$ represents the $j^{th}$ transmission of token $T_i$ in the respective acoustic spread spectrum signal;
c. records each transmit time $t_{i,j}$; and
d. repeats the above-described operations (a)-(c) for each of remaining tokens $T_2$-$T_{10}$. The repeated transmissions of the spread spectrum signals are shown generally at 1008.

In this way, for each token $T_i$, endpoint 12(1): generates a respective acoustic spread spectrum signal including a respective pilot sequence and a respective spread data sequence representing the token $T_i$; repeatedly transmits for a predetermined number of times the respective acoustic spread spectrum signal; and records the (transmit) time for each transmit iteration. Note that AMS 16 is typically programmed with information that conveys the approximate repeat intervals between token transmissions by endpoint 12(1) (and all such endpoints to which the AMS sends the tokens for transmission), and the AMS uses the information to ensure that a given token is transmitted by only one of these endpoints during a given time interval (thus ensuring "token uniqueness").

At 1010, endpoint 12(2) receives each of the acoustic spread spectrum signals transmitted by endpoint 12(1). Endpoint 12(2) processes each received acoustic spread spectrum signal according to method 900 to (i) determine a respective receive time $t_R$ of each received acoustic spread spectrum signal, and (ii) recover/decode a respective one of tokens $T_1$-$T_{10}$ from the received acoustic spread spectrum signal. As a practical matter, endpoint 12(2) will—after successfully decoding the token—generally have to "back-calculate" where the peak of the cross-correlation function was to determine when $t_R$ occurred. That is, the actual decoding of the token generally occurs after $t_R$.

At 1012, endpoint 12(2) sends to AMS 16 over network 20 one or more messages including the first recovered token, e.g., token $T_1$, and an indication of the corresponding receive time $t_R$. Endpoint 12(2) sends each token it decodes to AMS 16, along with the associated time $t_R$.

At 1014, in response to receiving the one or more messages including token $T_1$ and receive time $t_R$ from endpoint 12(2), AMS 16 sends to endpoint 12(1) over network 20 a request for the transmit times $t_{1,1}$-$t_{1,N}$ corresponding to the transmissions of tokens $T_1$-$T_{10}$ from endpoint 12(1).

At 1016, in response to receiving the request for the transmit times from AMS 16, endpoint 12(1) sends to AMS 16 over network 20 the recorded transmit times $t_{1,1}$-$t_{1,N}$.

At 1018, in response to receiving the recorded transmit times $t_{1,1}$-$t_{1,N}$ from endpoint 12(1), AMS 16 determines whether to pair/associate endpoint 12(1) with endpoint 12(2), i.e., performs pairing with respect to endpoints 12. To do this, AMS 16 performs the following operations. AMS 16 determines/selects the one of transmit times $t_{1,1}$-$t_{1,N}$ that is closest in time to receive time $t_R$, and computes a time difference $\Delta t$ between the determined/selected transmit time and receive time $t_R$. Then, AMS 16 computes a separation distance between endpoint 12(1) and endpoint 12(2) as the product $\Delta t$*the velocity of sound in air. The computed time difference $\Delta t$ and the separation distance are referred to herein as "ranging information." Care must be taken to account for maximum differences between endpoint 12(1) and endpoint 12(2) timebases (e.g., a maximum NTP difference), particularly for short acoustic transmission times. Since AMS 16 may have a better knowledge of the time accuracy of endpoints 12, there is a benefit of the AMS computing the separation distance.

Once AMS 16 has computed the separation distance, the AMS makes a pairing decision with respect to endpoints 12(1) and 102(2) based on (i) the computed separation distance, and (ii) the fact that token $T_1$ was received from endpoint 12(2) by the AMS, indicating a successful round-trip transmission of the token $T_1$ from the AMS to endpoint 12(1), and then from endpoint 12(2) back to the AMS (i.e., indicating that the token received from endpoint 12(2) matches the token initially sent to endpoint 12(1) by the AMS). In one example, AMS 16 decides to pair endpoint 12(1) with endpoint 12(2) only if (i) the token $T_1$ was received from endpoint 12(2) (i.e., the token received from endpoint 12(2) matches the token the AMS initially sent to endpoint 12(1)), and (ii) the separation distance is less than a predetermined threshold separation distance, e.g., less than 20 feet. If both conditions are met, AMS 16 considers endpoints 12 as paired endpoints, otherwise, AMS 16 does not consider the endpoints as paired.

Assuming AMS 16 successfully pairs endpoints 12 with each other, the AMS may instruct endpoint 12(1) to grant endpoint 12(2) to communicate with and establish a secure channel between endpoint 12(1) and endpoint 12(2) and over which the two devices may exchange information/content in a conference session, for example. To grant endpoint 12(2) access to a secure channel, AMS 16 may send an identifier of the secure channel to endpoint 12(1) and endpoint 12(2) directly (over network 20) using existing techniques for secure channel set up (e.g., TLS/SSL), or AMS 16 may send the identifier to endpoint 12(2) via endpoint 12(1). The identifier may identify a particular pilot sequence used to encode and decode the secure channel. Also, AMS 16 may download to endpoint 12(1) user profile information for the user associated with endpoint 12(2), such as a user phone number, an email address, and so on.

An alternative arrangement to that described above shifts the responsibility of computing time difference $\Delta t$ and the separation distance from AMS 16 to endpoint 12(1), while the responsibility of performing the pairing decision remains with the AMS. In the alternative arrangement, at 1014, AMS 16 sends to endpoint 12(1) over network 20 a request to compute the separation distance, instead of the request for transmit times $t_{1,1}$-$t_{1,N}$ described above. The request to compute the separation distance includes receive time $t_R$. In the alternative arrangement, at 1020, in response to receiving the request to compute the separation distance from AMS 16, endpoint 12(1) computes the separation distance as described above. At 1016, endpoint 12(1) sends the computed separation distance to AMS 16, instead of transmit times $t_{1,1}$-$t_{1,N}$ described above. Then, at 1018, AMS 16 makes the pairing decision using the computed separation distance provided by endpoint 12(1), as described above.

Figure 11:
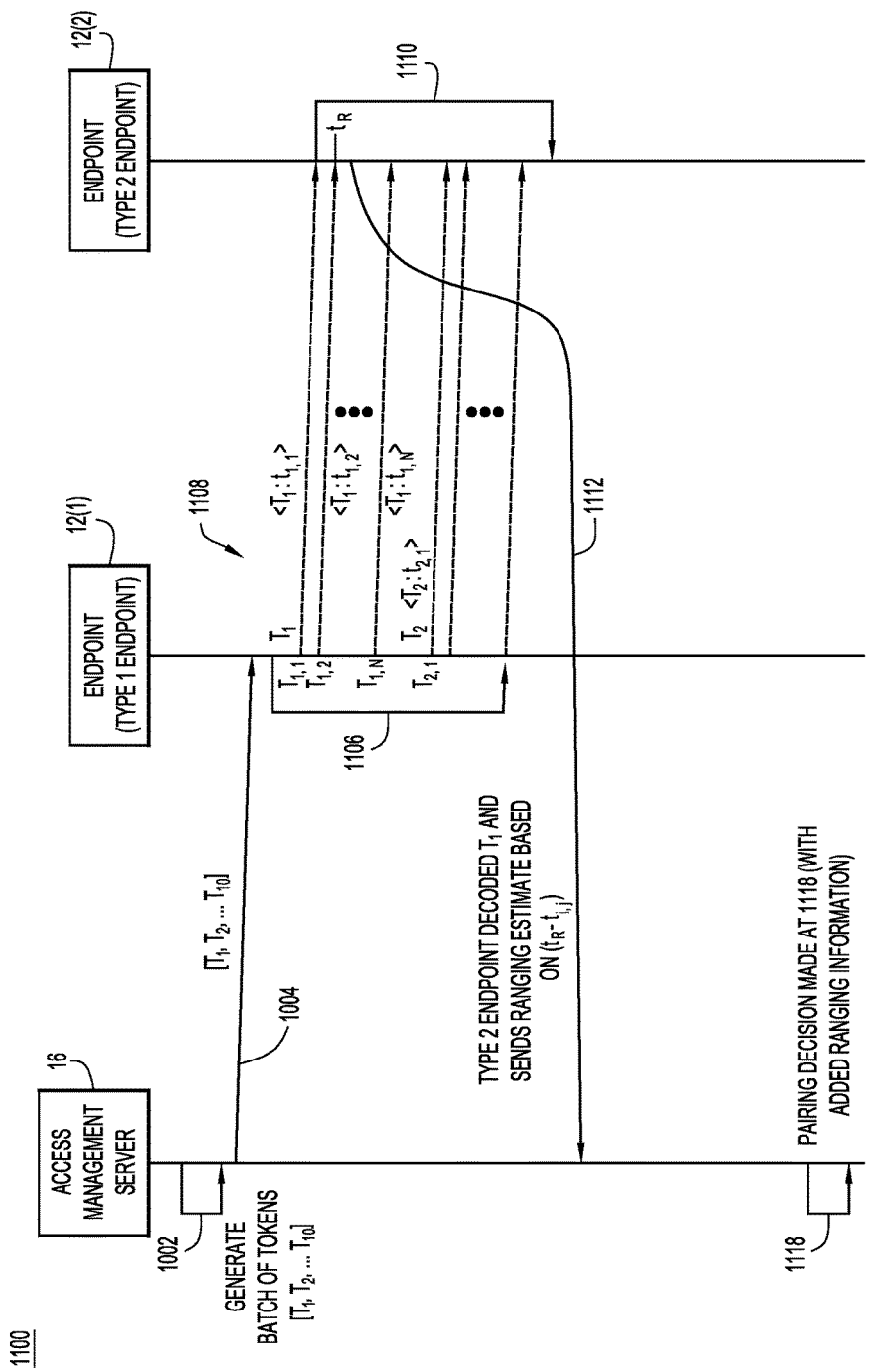
FIG. 11 is a transaction diagram by which proximity verification/authentication using an acoustic spread spectrum signal for token exchange and ranging information is achieved in the environment of FIG. 1A, according to a second embodiment.

With reference to FIG. 11, there is an example transaction diagram 1100 by which proximity verification/authentication using acoustic spread spectrum techniques for token exchange and ranging information is achieved in environment 10, according to a second embodiment. The second embodiment is similar to the first embodiment depicted in FIG. 10, except for differences described below.

At 1002 and 1004, AMS 16 generates tokens $T_1$-$T_{10}$ and sends the tokens to endpoint 12(1) as described above.

At 1106, in response to receiving tokens $T_1$-$T_{10}$ from AMS 16, endpoint 12(1) generates and transmits acoustic spread spectrum signals encoded with tokens $T_1$-$T_{10}$ similarly to the way the endpoint generates and transmits the acoustic spread spectrum signals in operation 1006, except that the endpoint also encodes an indication of the respective time $t_{i,j}$ at which each acoustic spread spectrum signal is to be transmitted into the spread spectrum signal along with the token $T_i$. That is, the spread data sequence encoded into each spread spectrum signal includes both the token $T_i$ and the respective transmit time $t_{i,j}$, as indicated by the descriptors $<T_i: t_{i,j}>$ in FIG. 11. For example, with reference again to FIG. 6, each token may be encoded as one of data eigenvectors 610*i* (e.g., 610*a*), while the time $t_{i,j}$ may replace one of the other eigenvectors (e.g., 610*b*).

To do this, endpoint 12(1) determines/estimates the future time at which each acoustic spread spectrum signal will be transmitted (i.e., transmit time $t_{i,j}$), encodes the future time into the acoustic spread spectrum signal, and then transmits the acoustic spread spectrum signal at the future time. The repeated transmissions of the spread spectrum signals encoded with both tokens and transmit times are shown generally at 1108 in FIG. 11. As a practical matter, encoding the future transmit times requires encoder 106 to know all of the time delays in transmitter TX 102, through acoustic modulator 108 and loudspeaker 11. Such time delays may be added to the pilot sequence and data frame boundary times mentioned above in connection with FIG. 4 to arrive at the transmit times. It is useful to note several factors, including (i) the time difference between successive token transmissions is generally much greater than an actual acoustic transmission time, (ii) only approximate millisecond (ms) accuracy is required, and (iii) as a result, the times $t_{i,j}$ may be units of time less than 1 ms (e.g., ½ ms) and be encoded relative to the nearest second of Coordinated Universal Time (UTC), e.g., as $2^{11}=2048$, a simple encoding of $t_{i,j}$ may require 11 bits.

At 1110, endpoint 12(2) receives each of the acoustic spread spectrum signals transmitted by endpoint 12(1) at 1108. Endpoint 12(2) processes each received acoustic spread spectrum signal according to method 900 to (i) determine a respective receive time $t_R$ of each received acoustic spread spectrum signal, (ii) recover a respective one of tokens $T_1$-$T_{10}$ from the received acoustic spread spectrum signal, and (iii) recover the corresponding transmit time $t_{i,j}$ also encoded in the received acoustic spread spectrum signal along with the tokens.

Armed with both receive time $t_R$ and the recovered transmit times $t_{i,j}$ (e.g., transmit times $t_{1,1}$-$t_{1,N}$), endpoint 12(2) determines/selects the one of transmit times $t_{i,j}$ that is closest in time to receive time $t_R$, and computes a time difference $\Delta t$ between the determined/selected transmit time and receive time $t_R$. Then, endpoint 12(2) computes a separation distance between endpoint 12(1) and endpoint 12(2) as the product $\Delta t$*the velocity of sound in air.

At 1112, endpoint 12(2) sends to AMS 16 over network 20 one or more messages including token $T_1$ and the computed separation distance.

At 1118, in response to receiving token $T_1$ and the computed separation distance from endpoint 12(2), AMS 16 determines whether to pair endpoint 12(1) with endpoint 12(2), i.e., performs pairing with respect to endpoints 12, as described above.

Figure 12:
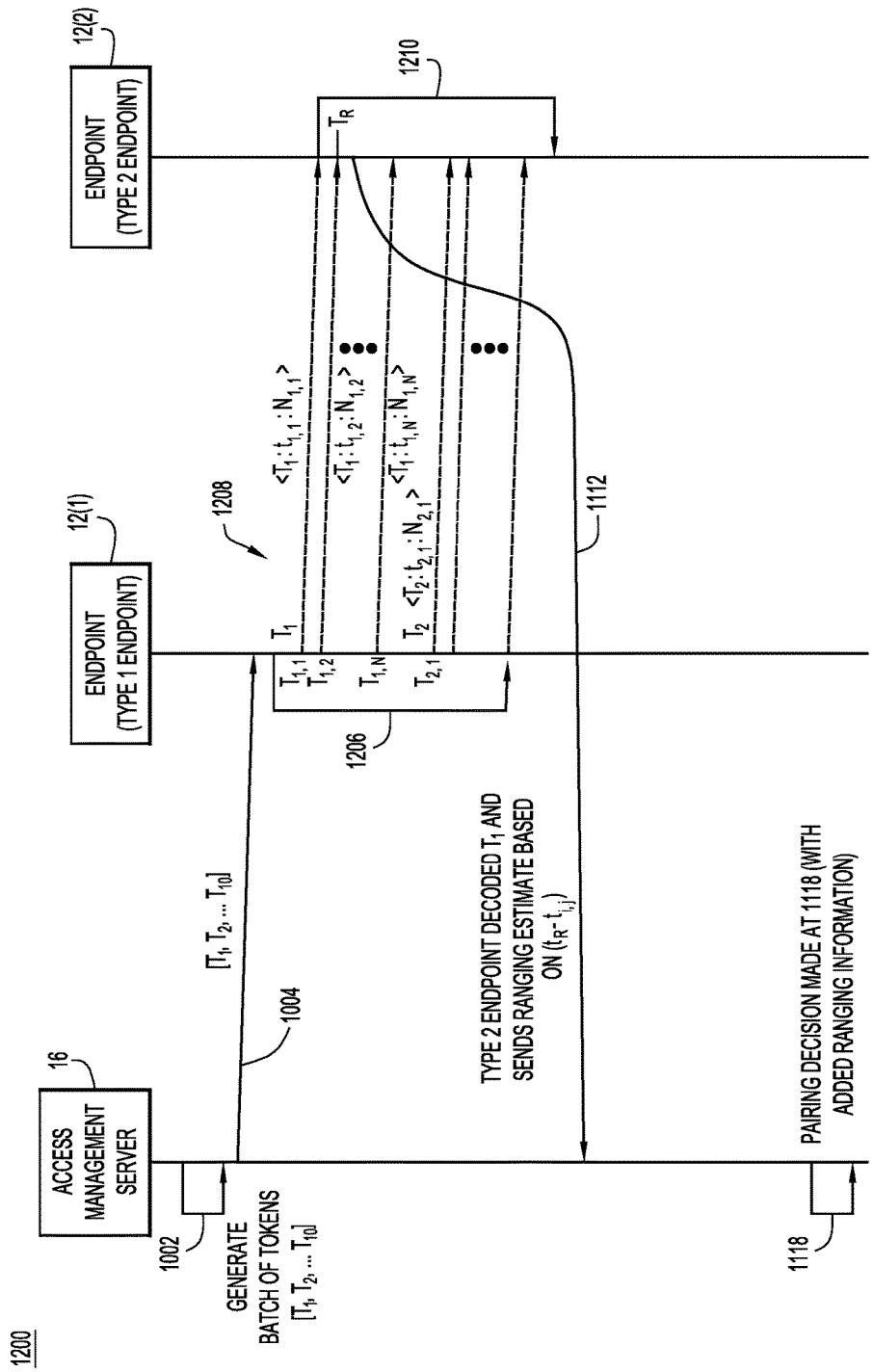
FIG. 12 is a transaction diagram by which proximity verification/authentication using an acoustic spread spectrum signal for token exchange and ranging information is achieved in the environment of FIG. 1A, according to a third embodiment.

With reference to FIG. 12, there is an example transaction diagram 1200 by which proximity verification/authentication using acoustic spread spectrum techniques for token exchange and ranging information is achieved in environment 10, according to a third embodiment. The third embodiment is similar to the second embodiment depicted in FIG. 11, except for differences described below.

At 1002 and 1004, AMS 16 generates tokens $T_1$-$T_{10}$ and sends the tokens to endpoint 12(1) as described above.

At 1206, in response to receiving tokens $T_1$-$T_{10}$ from AMS 16, endpoint 12(1) generates and transmits acoustic spread spectrum signals encoded with tokens $T_1$-$T_{10}$ similarly to the way the endpoint generates and transmits the acoustic spread spectrum signals in operation 1106, except that the endpoint also encodes an indication of how many more times $N_{i,j}$ the token $T_i$ encoded in the current acoustic spread spectrum signal will be transmitted before progressing to the next token $T_{i+1}$. Thus, each acoustic spread spectrum signal includes a spread data sequence that conveys token $T_i$, transmit time $t_{i,j}$, and number of subsequent transmissions $N_{i,j}$, as indicated by the tuple <$T_i$:$t_{i,j}$:$N_{i,j}$> in FIG. 12. The repeated transmissions of the spread spectrum signals, each encoded with the respective tuple <$T_i$:$t_{i,j}$:$N_{i,j}$>, are indicated generally at 1208 in FIG. 12.

An advantage of encoding the remaining number of transmissions of the current token is that it enables endpoint 12(2) to make an informed decision on how long to go to into a sleep mode before it has to wake up to decode the next token. For example, if endpoint 12(2) ranging estimates or other endpoint functionality (e.g., accelerometer) indicate that endpoint 12(2) is no longer moving relative to endpoint 12(1), endpoint 12(2) may go to sleep based on $N_{i,j}$. This saves decoding computes, and thus saves battery life in endpoint 12(2).

At 1210, endpoint 12(2) receives each of the acoustic spread spectrum signals transmitted by endpoint 12(1) at 1208. Endpoint 12(2) processes each received acoustic spread spectrum signal according to method 900 to (i) determine a respective receive time $t_R$ of each received acoustic spread spectrum signal, (ii) recover a respective one of tokens $T_1$-$T_{10}$ from the received acoustic spread spectrum signal, and (iii) recover the corresponding transmit time $t_{i,j}$ (and number of remaining transmissions) also encoded in the received acoustic spread spectrum signal along with the tokens.

Armed with both receive time $t_R$ and the recovered transmit times $t_{i,j}$ (e.g., transmit times $t_{1,1}$-$t_{1,N}$), endpoint 12(2) determines/selects the one of transmit times $t_{i,j}$ that is closest in time to receive time $t_R$, and computes a time difference $\Delta t$ between the determined/selected transmit time and receive time $t_R$. Then, endpoint 12(2) computes a separation distance between endpoint 12(1) and endpoint 12(2) as the product $\Delta t$*the velocity of sound in air.

At 1112, endpoint 12(2) sends to AMS 16 over network 20 one or more messages including token $T_1$ and the computed separation distance.

At 1118, in response to receiving token $T_1$ and the computed separation distance from endpoint 12(2), AMS 16 determines whether to pair endpoint 12(1) with endpoint 12(2), i.e., performs pairing with respect to endpoints 12, as described above.

Figure 13:
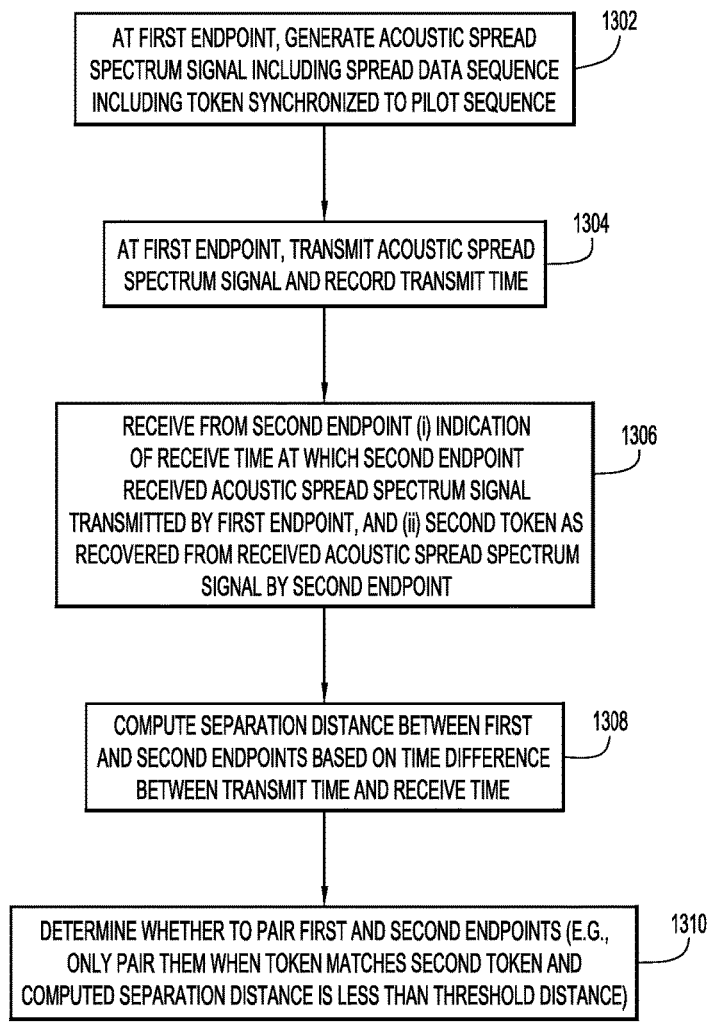
FIG. 13 is a flowchart of a method of pairing endpoints using an acoustic spread spectrum signal for token exchange and ranging information including operations from the method of FIG. 10, according to an embodiment.

With reference to FIG. 13, there is a flowchart of an example method 1300 of pairing endpoints using acoustic spread spectrum techniques for token exchange and ranging information. Method 1300 includes operations described above in connection with FIG. 10 (the first embodiment).

At 1302, a first endpoint (e.g., endpoint 12(1)) generates an acoustic spread spectrum signal including a pilot sequence and a spread data sequence representing a token synchronized to the pilot sequence. In an example, the spread data sequence representing/encoded with the token is based on the PONS code construction and the pilot sequence is based on the PONS code construction and is orthogonal to the data sequence.

At 1304, the first endpoint transmits the acoustic spread spectrum signal and records a transmit time at which the acoustic spread spectrum signal is transmitted.

At 1306, an indication of a receive time ($t_R$) at which a second endpoint (e.g., endpoint 12(2)) received the acoustic spread spectrum signal transmitted by the first endpoint is received and a second token, as recovered from the received acoustic spread spectrum signal by the second endpoint, is also received. For example, AMS 16 receives the receive time and the second token recovered and transmitted by the second endpoint.

At 1308, a separation distance between the first endpoint and the second endpoint is computed based on a time difference between the transmit time and the receive time. For example, AMS 16 computes the separation distance. In an alternative arrangement, after having received the receive time from the second endpoint, AMS 16 transmits the receive time to the first endpoint, which computes the separation distance and then sends the computed separation distance to the AMS.

At 1310, the first endpoint device is paired with the second endpoint device when the token matches the second token and the computed separation distance is less than a threshold distance, e.g., less than 20 feet. For example, AMS 16 performs the pairing.

With reference to FIG. 14, there is a flowchart of an example method 1400 of pairing endpoints using acoustic spread spectrum techniques for token exchange and ranging information. Method 1400 includes operations described above in connection with FIGS. 11 and 12 (the second and third embodiments).

At 1402, a first endpoint (e.g., endpoint 12(1)) generates an acoustic spread spectrum signal including a pilot sequence and a spread data sequence. The first endpoint encodes both a token and a future transmit time at which the acoustic spread spectrum signal will be transmitted into the acoustic spread spectrum signal. The first endpoint transmits the acoustic spread spectrum signal at the future transmit time.

At 1404, a second endpoint (e.g., endpoint 12(2)) receives the acoustic spread spectrum signal transmitted by the first endpoint, determines from the received acoustic spread spectrum signal a receive time, a second token corresponding to the token, and the future transmit time, computes a separation distance between the first and second endpoints based on a difference between the receive time and the future transmit time, and sends to a network the second token and the computed separation distance.

At 1406, AMS 16 receives from the second endpoint over the network the second token and the computed separation distance.

At 1408, AMS 16 pairs the first endpoint with the second endpoint device when the second token matches the token and the computed separation distance is less than a threshold distance.

Figure 15:
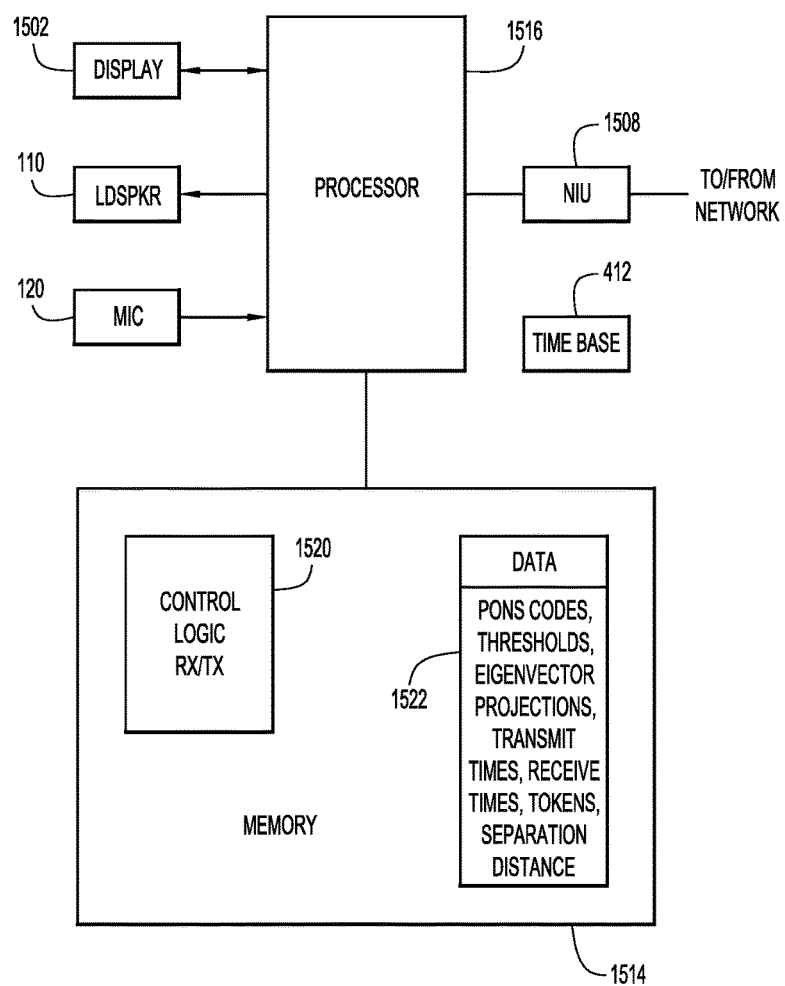
FIG. 15 is a block diagram of a communication device, e.g., an endpoint device, in which the spread spectrum acoustic transmitter and the spread spectrum acoustic receiver may be implemented, according to an example embodiment.

With reference to FIG. 15, there is a block diagram of an example communication device 1500 in which TX 102, RX 104, or both may be implemented. Example communication device 1500 may represent either of endpoints 12(1) or 12(2). There are numerous possible configurations for device 1500 and FIG. 15 is meant to be an example. Examples of device 1500 include a tablet computer, a personal computer, a laptop computer, a mobile phone, such as a smartphone, or a video conference endpoint or base station, and so on. Device 1500 may include a display 1502, loudspeaker 110, microphone 120, one or more network interface units (NIUs) 1508, and memory 1514 each coupled to a processor 1516, and timebase 412. The one or more NIUs 1508 may include wired and/or wireless connection capability that allows processor 1516 to communicate over a communication network. For example, NIUs 1508 may include an Ethernet card to communicate over an Ethernet connection, a wireless RF transceiver to communicate wirelessly with cellular networks in the communication network, optical transceivers, and the like, as would be appreciated by one or ordinary skill in the relevant arts. Timebase 412 may include one or more oscillators and/or clocks, and may also include a Global Positioning Systems (GPS) receiver to recover location and time, which may be used to time-synchronize multiple ones of devices 1500. Also, timebase 412 may include applications to implement time synchronization via NTP, and so on.

Processor 1516 may include a collection of microcontrollers and/or microprocessors, for example, each configured to execute respective software instructions stored in the memory 1514. The collection of microcontrollers may include, for example: a video controller to receive, send, and process video signals or images related to display 1502; an audio processor to receive, send/transmit, and process audio/sound signals related to loudspeaker 110 and microphone 120 as described herein; and a high-level controller to provide overall control. Portions of memory 1514 (and the instructions therein) may be integrated with processor 1516. As used herein, the terms "audio" and "sound" are synonymous and interchangeable.

The memory 1514 may include read only memory (ROM), random access memory (RAM), magnetic disk storage media devices, optical storage media devices, flash memory devices, electrical, optical, or other physical/tangible (e.g., non-transitory) memory storage devices. Thus, in general, the memory 1514 may comprise one or more computer readable storage media (e.g., a memory device) encoded with software comprising computer executable instructions and when the software is executed (by the processor 1516) it is operable to perform the operations described herein. For example, the memory 1514 stores or is encoded with instructions for control logic 1520 to perform operations described herein related to TX 102 and RX 104, including endpoint operations associated with methods 800, 900, 1300, 1400, and transaction diagrams 1000-1200.

In addition, memory 1514 stores data/information 1522 used and generated by logic 1520.

Figure 16:
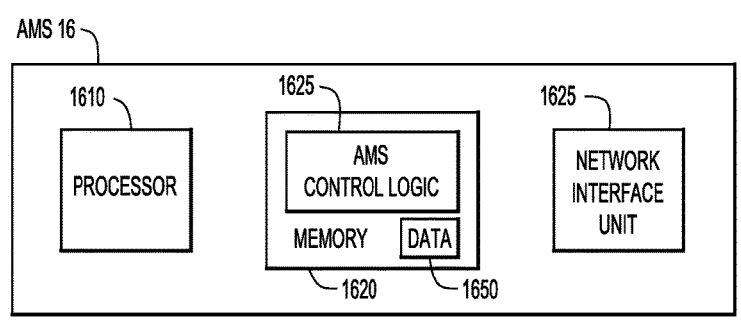
FIG. 16 a simplified block diagram of an access management server from FIG. 1A, according to an embodiment.

With reference to FIG. 16, a simplified block diagram of access management server 16 is shown, according to an embodiment. Server 16 includes a processor 1610 to process instructions relevant to proximity verification in environment 10, memory 1620 to store a variety of data and software instructions, including access management server control logic/software 1625. Server 106 also includes a network interface unit 1625 similar to network interface unit 1508 described above that enables network communications so that the server can communicate with other devices, e.g., endpoints 12. Memory 1620 may comprise read only memory (ROM), random access memory (RAM), magnetic disk storage media devices, optical storage media devices, flash memory devices, electrical, optical, or other physical/tangible (e.g., non-transitory) memory storage devices. Processor 1610 is, for example, a microprocessor or microcontroller that executes instructions for implementing the processes described herein. Thus, in general, memory 1620 may comprise one or more tangible (non-transitory) computer readable storage media (e.g., a memory device) encoded with software (e.g., the meeting server control logic/software 1625) comprising computer executable instructions and when the software is executed (by the processor 1610) it is operable to perform the AMS operations described herein, including operations associated with methods 1300 and 1400, and transaction diagrams 1000-1200.

Memory 1620 also stores data 1650 generated and used by logic 1625.

In summary, embodiments presented herein are directed to proximity pairing of endpoints using acoustic spread spectrum token exchange and ranging information. The embodiments add an acoustic ranging feature as an additional metric upon which a pairing/association decision can be based. By recording the time instant of the sending of an ultrasound token from an ultrasound speaker and recording the time instance(s) of the reception of the same ultrasound token at a microphone of a capture device (via detection of a cross-correlation peak) the "flight time" of the token can be determined. This is the flight time of the dominant path from the ultrasound speaker to the microphone at the capture device (which may include reflections). This flight time is linearly related to the distance of the dominant path between the speaker and the microphone. Thus the apparent distance can be determined. In an example, an endpoint using NTP can resolve times to sub-millisecond accuracy. An endpoint using other means may attain even more time accuracy. By comparing the time at which the cross-correlation peak occurs at the receiver with the time of the beginning of the pilot sequence that was sent at the sender, and knowing the speed of sound, the acoustic time of flight and separation of the dominant path can be determined. Assuming sub-millisecond accuracy, e.g., the sending and receiving endpoints have a sub-millisecond synchronization to NTP, the dominant path separations may be determined to within approximately 11 inches, which is sufficient for making a pairing decision.

In summary, in one form, a method is provided comprising: at a first endpoint device, generating an acoustic spread spectrum signal including a pilot sequence and a spread data sequence representing a token synchronized to the pilot sequence; at the first endpoint device, transmitting the acoustic spread spectrum signal and recording a transmit time at which the acoustic spread spectrum signal is transmitted; receiving from a second endpoint device an indication of a receive time at which the second endpoint device received the acoustic spread spectrum signal transmitted by the first endpoint device and a second token as recovered from the received acoustic spread spectrum signal by the second endpoint device; computing a separation distance between the first endpoint device and the second endpoint device based on a time difference between the transmit time and the receive time; and pairing the first endpoint device with the second endpoint device when the token matches the second token and the computed distance is less than a threshold distance.

In another form, a system is provided comprising: a first endpoint including: an encoder and a modulator to generate an acoustic spread spectrum signal including a pilot sequence and a spread data sequence representing a token synchronized to the pilot sequence; and a loudspeaker to transmit the acoustic spread spectrum signal, wherein the first endpoint device is configured to record a transmit time at which the acoustic spread spectrum signal is transmitted; and a management entity including: a network interface to communicate with a network; and a processor coupled with the network interface and configured to: receive from a second endpoint device an indication of a receive time at which the second endpoint device received the acoustic spread spectrum signal transmitted by the first endpoint device and a second token as recovered from the received acoustic spread spectrum signal by the second endpoint device; compute a separation distance between the first endpoint device and the second endpoint device based on a difference between the transmit time and the receive time; and pair the first endpoint device with the second endpoint device when the token matches the second token and the computed separation distance is within a threshold distance.

In yet another form, a method is provided comprising: at a first endpoint device: generating an acoustic spread spectrum signal including a pilot sequence and a spread data sequence synchronized with the pilot sequence, wherein the spread data sequence encodes a token and a future transmit time at which the acoustic spread spectrum signal will be transmitted; and transmitting the acoustic spread spectrum signal at the future transmit time; at a second endpoint device: receiving the acoustic spread spectrum signal; determining from the received acoustic spread spectrum signal a receive time, a second token corresponding to the token, and the future transmit time; computing a separation distance between the first endpoint device and the second endpoint device based on a difference between the receive time and the future transmit time; and sending to the network the second token and the computed separation distance; receiving from the second endpoint device over the network the second token and the computed separation distance; and pairing the first endpoint device with the second endpoint device when the second token matches the token and the computed separation distance is less than a threshold distance.

The methods described herein can also be embodied by software instructions stored in a non-transitory computer readable storage medium, that when executed by at least one processor, cause the processor to perform the operations of the respective methods described herein.

Further still, in another form, an device is provided that includes a processor, a transmitter and a receiver. The processor generates an acoustic spread spectrum signal including a pilot sequence and a spread data sequence representing a token synchronized to the pilot sequence. The transmitter transmits the acoustic spread spectrum signal and records a transmit time at which the acoustic spread spectrum signal is transmitted. The receiver receives from a another device an indication of a receive time at which the other device received the acoustic spread spectrum signal transmitted by the device and a second token as recovered from the received acoustic spread spectrum signal by the other device. The processor computes a separation distance between the device and the other device based on a time difference between the transmit time and the receive time. The device may be paired with the other device when the token matches the second token and the computed distance is less than a threshold distance.

The above description is intended by way of example only. Various modifications and structural changes may be made therein without departing from the scope of the concepts described herein and within the scope and range of equivalents of the claims.

What is claimed is:

1. A method comprising:
   at a first endpoint device, generating an acoustic spread spectrum signal including a pilot sequence and a spread data sequence representing a token synchronized to the pilot sequence;
   at the first endpoint device, transmitting the acoustic spread spectrum signal and recording a transmit time at which the acoustic spread spectrum signal is transmitted;
   receiving from a second endpoint device an indication of a receive time at which the second endpoint device received the acoustic spread spectrum signal transmitted by the first endpoint device and a second token as recovered from the received acoustic spread spectrum signal by the second endpoint device;
   computing a separation distance between the first endpoint device and the second endpoint device based on a time difference between the transmit time and the receive time; and
   pairing the first endpoint device with the second endpoint device when the token matches the second token and the computed distance is less than a threshold distance.

2. The method of claim 1, wherein the pairing includes permitting the second endpoint device access to an information carrying channel between the first endpoint device and the second endpoint device.

3. The method of claim 1, further comprising, at the second endpoint device:
receiving the acoustic spread spectrum signal transmitted by the first endpoint device;
correlating the received acoustic spread spectrum signal with a replica of the pilot sequence to produce a correlation peak indicative of a presence of the pilot sequence;
decoding the data sequence based on timing of the correlation peak to recover the second token from the data sequence; and
determining the receive time based on the timing of the correlation peak.

4. The method of claim 1, further comprising:
repeatedly transmitting the acoustic spread spectrum signal and recording a respective transmit time at which each repeated acoustic spread spectrum signal is transmitted;
determining which of the recorded transmit times is nearest in time to the receive time;
wherein the computing includes computing the separation distance based on the receive time and the transmit time determined to be nearest in time to the receive time.

5. The method of claim 1, wherein the data sequence representing the token is based on a Prometheus Orthonormal Set (PONS) code construction and the pilot sequence is based on the PONS code construction and is orthogonal to the data sequence.

6. The method of claim 5, wherein each of the data sequence and the pilot sequence includes a respective sequence of PONS coefficients that sum together to a value of zero.

7. The method of claim 5, wherein the data sequence includes a sequence of PONS coefficients having a length equal to a first odd power of 2 and the pilot sequence includes a sequence of PONS coefficients having a second length equal to a second odd power of 2.

8. The method of claim 1, further comprising:
initially sending a message carrying the token from a management entity, configured to communicate with the first endpoint device and the second endpoint device over a network, to the first endpoint device to cause the first endpoint device to perform the generating, the transmitting, and the recording.

9. The method of claim 8, further comprising, at the management entity:
sending to the first endpoint device a request for the transmit time;
receiving from the first endpoint device a message indicating the transmit time,
wherein the computing the separation distance and the pairing are each performed at the management entity.

10. The method of claim 8, wherein the receiving includes receiving at the management entity the indication of the receive time and the second token, and the method further comprises:
sending from the management entity to the first endpoint device the indication of the receive time;
performing the computing the separation distance at the first endpoint device; and
sending the computed separation distance from the first endpoint device to the management entity,
wherein the pairing is performed at the management entity.

11. A system comprising:
a first endpoint including: an encoder and a modulator to generate an acoustic spread spectrum signal including a pilot sequence and a spread data sequence representing a token synchronized to the pilot sequence; and a loudspeaker to transmit the acoustic spread spectrum signal, wherein the first endpoint device is configured to record a transmit time at which the acoustic spread spectrum signal is transmitted; and
a management entity including:
a network interface to communicate with a network; and
a processor coupled with the network interface and configured to:
receive from a second endpoint device an indication of a receive time at which the second endpoint device received the acoustic spread spectrum signal transmitted by the first endpoint device and a second token as recovered from the received acoustic spread spectrum signal by the second endpoint device;
compute a separation distance between the first endpoint device and the second endpoint device based on a difference between the transmit time and the receive time; and
pair the first endpoint device with the second endpoint device when the token matches the second token and the computed separation distance is within a threshold distance.

12. The system of claim 11, wherein the processor is configured to pair by permitting the second endpoint device access to an information carrying channel between the first endpoint device and the second endpoint device.

13. The system of claim 11, wherein the second endpoint device is configured to:
receive the acoustic spread spectrum signal transmitted by the first endpoint device;
correlate the received acoustic spread spectrum signal with a replica of the pilot sequence to produce a correlation peak indicative of a presence of the pilot sequence;
decode the data sequence based on timing of the correlation peak to recover the second token from the data sequence; and
determine the receive time based on the timing of the correlation peak.

14. The system of claim 11, wherein the data sequence representing the token is based on a Prometheus Orthonormal Set (PONS) code construction and the pilot sequence is based on the PONS code construction and is orthogonal to the data sequence.

15. The method of claim 11, wherein the processor is further configure to:
initially send a message carrying the token to the first endpoint device over the network to cause the first endpoint device to perform the operations to generate, transmit, and record.

16. A method comprising:
at a first endpoint device: generating an acoustic spread spectrum signal including a pilot sequence and a spread data sequence synchronized with the pilot sequence, wherein the spread data sequence encodes a token and a future transmit time at which the acoustic spread spectrum signal will be transmitted; and transmitting the acoustic spread spectrum signal at the future transmit time;

at a second endpoint device: receiving the acoustic spread spectrum signal; determining from the received acoustic spread spectrum signal a receive time, a second token corresponding to the token, and the future transmit time; computing a separation distance between the first endpoint device and the second endpoint device based on a difference between the receive time and the future transmit time; and sending to the network the second token and the computed separation distance;

receiving from the second endpoint device over the network the second token and the computed separation distance; and pairing the first endpoint device with the second endpoint device when the second token matches the token and the computed separation distance is less than a threshold distance.

17. The method of claim 16, wherein the spread data sequence encoding the token is based on a Prometheus Orthonormal Set (PONS) code construction and the pilot sequence is based on the PONS code construction and is orthogonal to the data sequence.

18. The method of claim 16, wherein the generating includes encoding respective incrementally increasing future times into respective acoustic spread spectrum signals into which the token is encoded, and transmitting the respective acoustic spread spectrum signals at the respective incrementally increasing future times.

19. The method of claim 18, wherein the generating includes generating a sequence of acoustic spread spectrum signals each including a respective token of a sequence of tokens.

20. The method of claim 16, wherein the generating further includes encoding an indication of a number of remaining times will be transmitted before transitioning to a next token.

* * * * *

UNITED STATES PATENT AND TRADEMARK OFFICE
CERTIFICATE OF CORRECTION

PATENT NO. : 10,141,973 B1  
APPLICATION NO. : 15/631679  
DATED : November 27, 2018  
INVENTOR(S) : Michael A. Ramalho et al.

Page 1 of 1

It is certified that error appears in the above-identified patent and that said Letters Patent is hereby corrected as shown below:

In the Claims

Claim 20, Column 26, Line 16, replace "times" with --times the acoustic spread spectrum signal--

Signed and Sealed this
Twenty-ninth Day of January, 2019

Andrei Iancu
*Director of the United States Patent and Trademark Office*